United States Patent
Yanai et al.

(10) Patent No.: US 7,948,657 B2
(45) Date of Patent: May 24, 2011

(54) IMAGE PROCESSING METHOD AND IMAGE PROCESSING APPARATUS

(75) Inventors: Tomokazu Yanai, Yokohama (JP); Atsushi Ushiroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 11/473,238

(22) Filed: Jun. 23, 2006

(65) Prior Publication Data

US 2006/0290987 A1 Dec. 28, 2006

(30) Foreign Application Priority Data

Jun. 27, 2005 (JP) ................. 2005-187084

(51) Int. Cl.
*H04N 1/40* (2006.01)
*G06K 15/00* (2006.01)

(52) U.S. Cl. ............ 358/3.01; 358/3.02; 358/3.03; 358/3.12

(58) Field of Classification Search ........... 358/3.01, 358/3.03, 3.02, 3.09, 2.12, 534, 535, 536; 382/252, 251

See application file for complete search history.

(56) References Cited

U.S. PATENT DOCUMENTS

| | | | |
|---|---|---|---|
| 6,099,105 A | 8/2000 | Kakutani | 347/15 |
| 6,831,756 B1 | 12/2004 | Ushiroda | 358/1.9 |
| 6,917,446 B2* | 7/2005 | Tanaka et al. | 358/1.9 |
| 6,952,288 B2 | 10/2005 | Yamada et al. | 358/1.9 |
| 7,099,046 B2 | 8/2006 | Yamada et al. | 358/3.03 |
| 7,187,473 B2 | 3/2007 | Yamada et al. | 358/1.9 |
| 2002/0097456 A1* | 7/2002 | Yamada et al. | 358/536 |
| 2003/0197897 A1* | 10/2003 | Iwasaki et al. | 358/3.03 |
| 2004/0263883 A1 | 12/2004 | Nishikori et al. | 358/1.9 |

FOREIGN PATENT DOCUMENTS

| | | |
|---|---|---|
| JP | 3208777 | 9/2001 |
| JP | 2002-171420 A | 6/2002 |
| JP | 2004-336570 | 11/2004 |

* cited by examiner

*Primary Examiner* — Benny Q Tieu
*Assistant Examiner* — Ngon Nguyen
(74) *Attorney, Agent, or Firm* — Fitzpatrick, Cella, Harper & Scinto

(57) ABSTRACT

An image processing method for deciding the quantization data on each image plane of the image data composed of at least first and second image planes includes performing a quantization process for the sum total value of pixel values existing at the same position on the first and second image planes, using a first threshold, to decide a quantized value, and performing an arithmetical operation on the decided quantized value, the pixel value of any one of the first and second image planes and a second threshold, to generate the quantization data on each of the first and second image planes.

6 Claims, 15 Drawing Sheets

FIG. 6
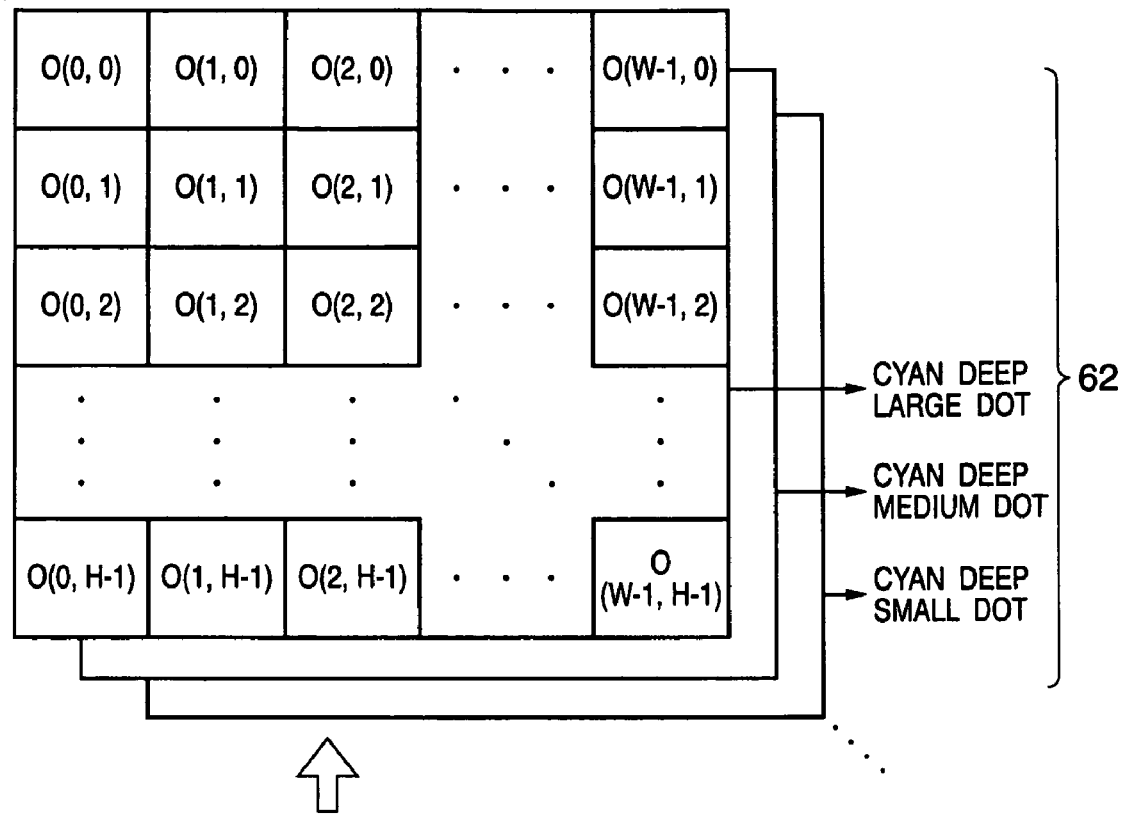
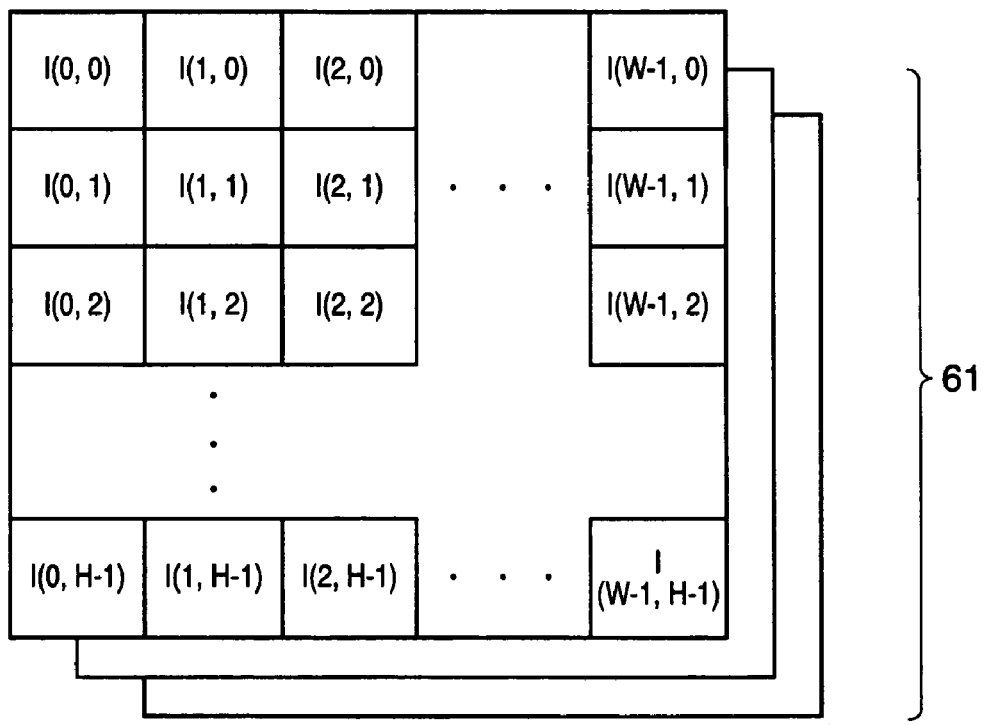

IMAGE PROCESSING METHOD AND IMAGE PROCESSING APPARATUS

FIELD OF THE INVENTION

The present invention relates to image processing for converting the number of gradations for an input image into a smaller number of gradations to form an image using a recording material represented by a toner or ink.

BACKGROUND OF THE INVENTION

As an information output apparatus in a word processor, a personal computer or a facsimile, for example, a recording apparatus for recording the desired information such as character or image on the sheet recording medium such as paper or film is employed. There are various methods for such recording apparatus, but among others, a method for forming the text or image on the recording medium by depositing the recording material on the recording medium has been widely put to practical use. A typical example of this method is an ink jet recording apparatus.

The ink jet recording apparatus employs a nozzle group in which a plurality of ink discharge openings (nozzles) capable of discharging the ink of the same color and same density are integrally arranged to increase the recording speed or improve the image quality. Further, for higher image quality, it may have a nozzle group in which the ink of the same color and different density can be discharged, or the ink of the same color and same density can be discharged at several stages of discharge amount.

In such an image forming apparatus, as means for converting the multi-value input image data into the binary image equivalent to a recording signal of dots (or the image taking two or more values and having a smaller number of gradations than the input number of gradations), there is an error diffusion method. This error diffusion method makes a pseudo gradation representation by diffusing a binarization error occurring in a certain pixel over plural following pixels.

With the above error diffusion method, an image processing method involving the dot arrangement control for the ink of the same color and different density or the ink of different color has been offered. For example, in the image processing method as disclosed in U.S. Pat. No. 3,208,777, when the ink dots of the same color and different density are arranged, the dot of higher density (referred to as a deep dot) is firstly arranged by the error diffusion method, and the output position of the deep dot is optimally decided. And the decided output position of the deep dot is reflected to the position calculation by the error diffusion method of the lower density dot (hereinafter referred to as a faint dot) by the error diffusion method. With this technique, the optimal arrangement position of the faint dot can be decided to resolve a density error caused by the deep dot.

Also, in Japanese Patent Application Laid-Open No. 2004-336570, it was disclosed that the pseudo gradation output values for forming a pseudo gradation image with plural kinds of dots were decided, based on the correlation of plural independent image data corresponding to plural kinds of dots.

However, with the method as described in U.S. Pat. No. 3,208,777, an arrangement of dots having higher priority is decided, the correction data for reflecting the arrangement is produced, the data of dots having next higher priority is corrected using the correction data, and the arrangement position is decided. That is, in order to decide the arrangement of dot in the next order, it is requisite to perform a process of producing the correction data based on the arrangement of dot in its upper order, and correcting the data of dot in the next order, whereby the process is complex and the processing time is increased.

Also, with the method as described in U.S. Pat. No. 3,208,777, the arrangement position is decided in the order from the dot of higher priority, and the arrangement of dot having the next priority is decided in consideration of the arrangement result, whereby the arrangement computation by error diffusion must be performed in the order for all the dots. That is, when there are n plane data in which the ink amount is specified for each of the density, color and dot diameter, the error diffusion processing must be necessarily performed by n times until the final dot position is obtained.

Also, the method as described in U.S. Pat. No. 3,208,777 is not said to be effective for processing the color material of the color of the same density and different color. For example, when two plane data of cyan and magenta of the same density are binarized, the position of any one color of cyan and magenta is optimally decided, but the position of the other color can not be optimally decided.

Further, with the method as described in Japanese Patent Application Laid-Open No. 2004-336570, the pseudo gradation output values are decided simultaneously for a plurality of planes using an LUT table, whereby there is no idea of priority order regarding the dot arrangement.

SUMMARY OF THE INVENTION

The invention has been achieved in the light of the above-mentioned problems, and it is an object of the invention to make the dot arrangement of color material according to the priority of dot with a simpler procedure.

According to one aspect of the present invention, there is provided an image processing method for converting multi-value data on each image plane of image data composed of n (n is an integer of 2 or more) image planes into a quantized value, comprising: a first generation step of converting the total value of corresponding pixels on the n image planes into a quantized value at n+1 levels through an error diffusion process to generate a first quantized value involving n image planes; a second generation step of converting a difference between the total value of corresponding pixels on the n−k image planes among the n image planes, where k is an integer of 1 or more, and the first quantized value, into a quantized value at k+1 levels to generate a second quantized value involving the remaining k image planes; a third generation step of having a difference between the second quantized value and the first quantized value as a third quantized value involving the n−k image planes and dispersing an error caused by quantization over other pixels to be reflected to the total value of the pixels at the second generation step; and a decision step of deciding each of the quantized values on the n image planes using the quantized values generated at the second and third generation steps.

According to another aspect of the present invention, there is provided a n image processing method for deciding quantization data on each image plane of image data composed of at least first and second image planes, comprising: a quantization step of performing a quantization process for the sum total value of pixel values existing at the same position on the first and second image planes, using a first threshold, and deciding a quantized value; and a generation step of performing an arithmetical operation on the quantized value decided at the quantization step, the pixel value of any one of the first and second image planes and the second threshold, and generating the quantization data on each of the first and second image planes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing the details of the configuration of a halftone image storage memory;

DETAILED DESCRIPTION OF THE PREFERRED EMBODIMENTS

Preferred embodiments of the present invention will now be described in detail in accordance with the accompanying drawings.

First Embodiment

Figure 1:
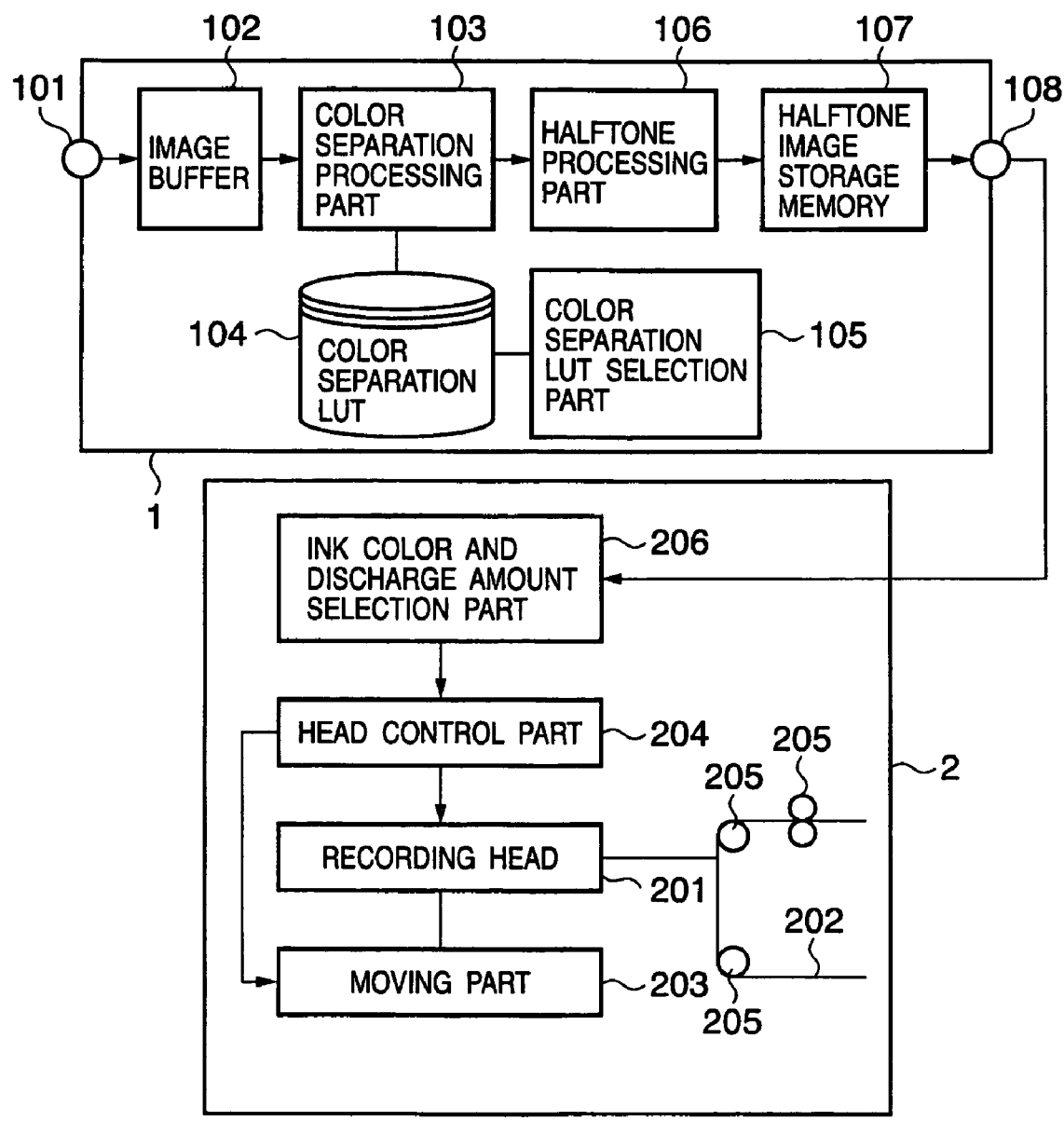
FIG. 1 is a block diagram showing the configuration of an image processing apparatus and a printer according to an embodiment of the invention.

FIG. 1 is a block diagram showing the configuration of an image forming apparatus according to a first embodiment of the invention. In FIG. 1, reference numeral 1 designates an image processing apparatus, and reference numeral 2 designates a printer. The image processing apparatus 1 may be realized by a printer driver installed in a general personal computer, for example. In this case, each part of the image processing apparatus 1 as will be described later is implemented by executing a predetermined program on a computer. In another configuration, the printer 2 may comprise the image processing apparatus 1.

Figure 4:
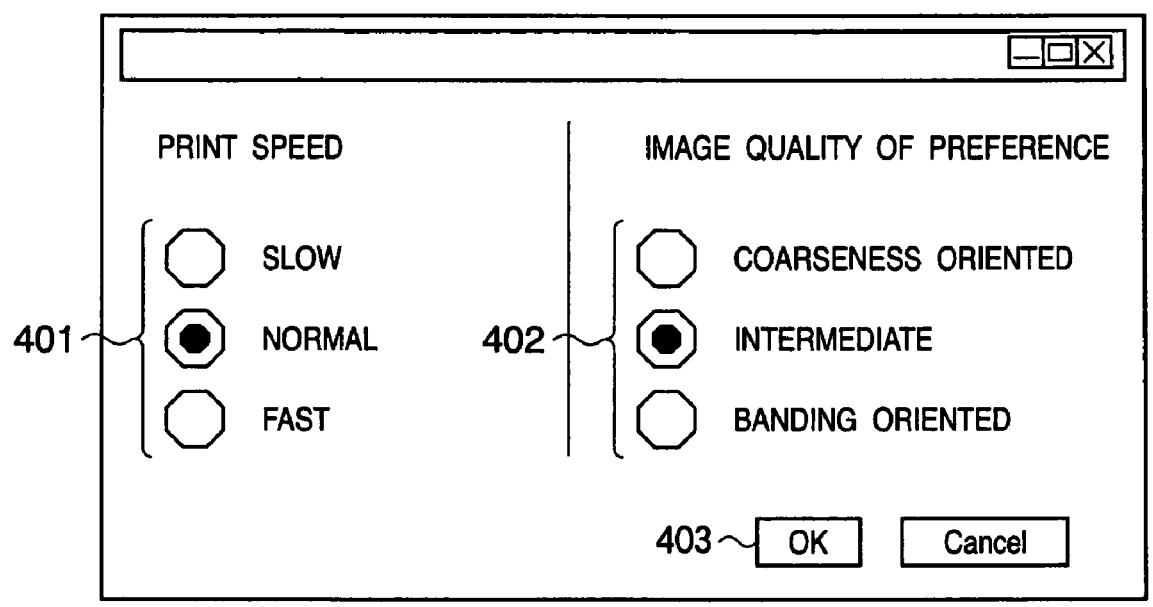
FIG. 4 is a view showing a UI example for allowing the user to select a color separation LUT.

The image processing apparatus 1 and the printer 2 are connected via a printer interface or a network interface. The image processing apparatus 1 inputs the image data to be printed from an image data input terminal 101, and stores the input image data in an image buffer 102. A color separation processing part 103 separates an input color image into ink colors that the printer 2 has. In this color separation processing, a color separation look-up table (LUT) 104 is referred to. A color separation LUT selection part 105 selects the color separation look-up table (LUT) for use in accordance with a processing state specified by the user via a user interface (UI) as shown in FIG. 4.

A halftone processing part 106 converts the image data of multiple (three or more) gradations for each color obtained by the color separation processing part 103 into binary image data. The obtained binary image data for each color is stored in a halftone image storage memory 107. The binary image data stored in the halftone image storage memory 107 is outputted from an output terminal 108 to the printer 2.

The printer 2 forms the image on the recording medium by moving a recording head 201 longitudinally and transversely relative to the recording medium 202. The recording head may use a wire dot method, a thermosensitive method, a thermal transfer method or an ink jet method, and has one or more recording elements (nozzles in the ink jet method) in any method. A moving part 203 moves the recording head 201 under the control of a head control part 204. A conveying part 205 conveys the recording medium under the control of the head control part 204. Also, an ink color and discharge amount selection part 206 selects the ink color and the discharge amount from among the ink colors for the recording head 201 and the ink discharge amounts that can be discharged by the head, based on the binary image data of each color formed by the image processing apparatus 1. This invention is not limited to the above-mentioned recording methods of the printer, but may be applied to the image forming apparatus of an electrophotographic method, for example.

Figure 2:
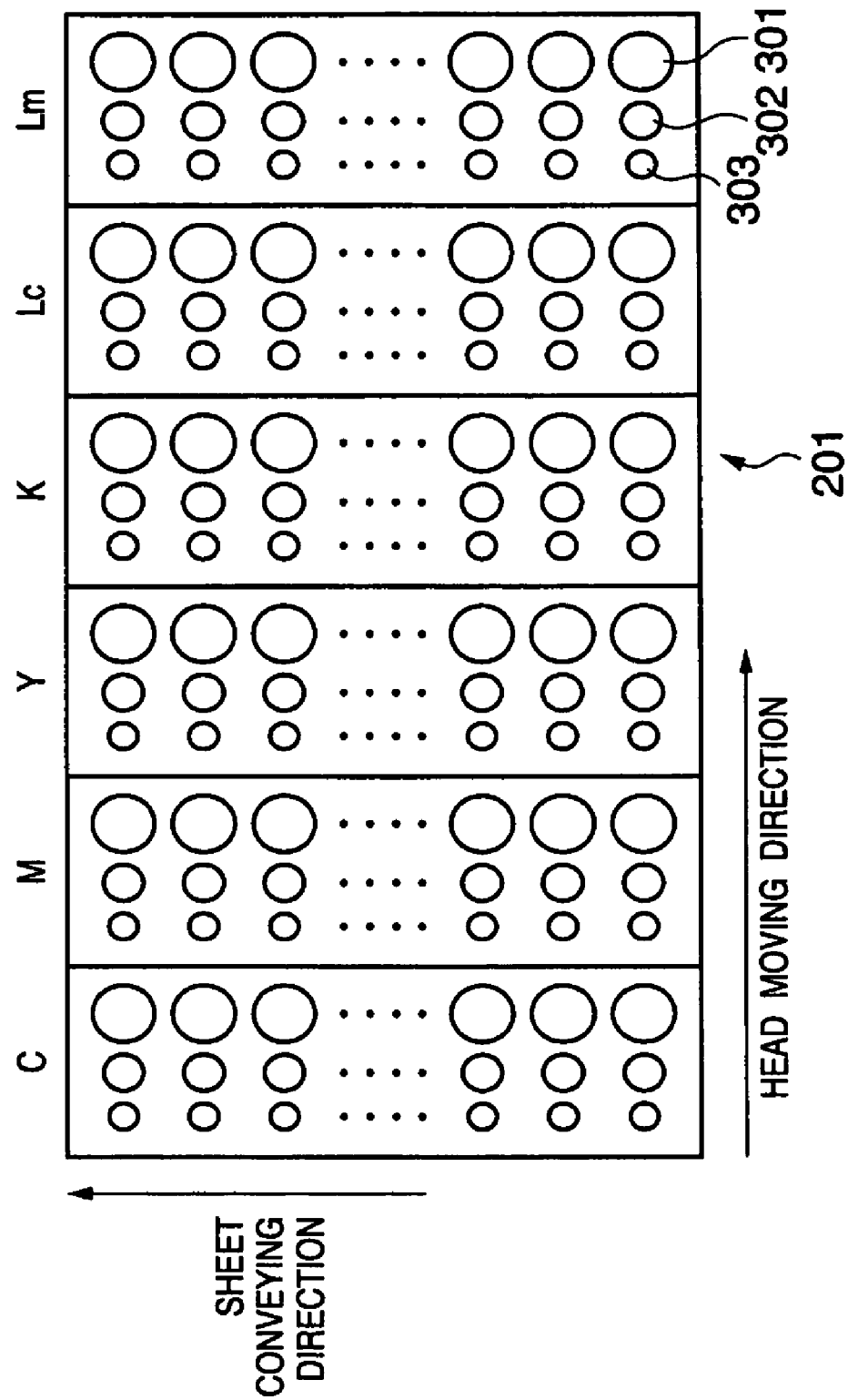
FIG. 2 is a view showing an organization example of a recording head according to the embodiment.

FIG. 2 is a view showing an organization example of the recording head 201. In this embodiment, the recording head has the inks of six colors including a faint cyan (Lc) and a faint magenta (Lm) with relatively lower ink density, in addition to the inks of four colors, cyan (C), magenta (M), yellow (Y) and black (B). Further, the recording head 201 has three kinds of discharge nozzles having different discharge amounts (formation dot sizes) for each color. That is, a discharge nozzle 301 discharges ink droplets having a greater ink discharge amount, and a discharge nozzle 303 discharges ink droplets having a relatively smaller ink discharge amount than the discharge nozzle 301. And a discharge nozzle 302 discharges ink droplets having a discharge amount between the discharge nozzle 301 and the discharge nozzle 303. In the following, a dot formed by an ink droplet having greater ink discharge amount is called a large dot. Also, a dot formed by an ink discharge amount relatively smaller than the ink discharge amount forming the large dot is called a small dot. Also, a dot formed by an ink droplet having a discharge amount between the large dot and the small dot is called a medium dot. In this way, the recording head 201 can form three kinds of dots having different discharge amounts for a total of six color inks.

In FIG. 2, for the sake of simplifying the explanation, the recording head has a configuration in which the nozzles are arranged in a row in the sheet conveying direction, but the number and arrangement of nozzles are not limited thereto. For example, plural rows of nozzles may be provided for each discharge amount, or the nozzles may be arranged in a zigzag.

The order of arranging the ink colors is sequential in the head movement direction in FIG. 2, but may be sequential in the sheet conveying direction.

Herein, the effect of using the deep and faint dots and the large, medium and small dots will be described below. The purpose for using the deep and faint dots is to increase the number of representable gradations by forming the image using multiple inks having different densities in the printer that makes the pseudo gradation representation by turning on or off the dot. By increasing the number of representable gradations, the rich gradation reproducibility can be realized. Further, using the large, medium and small dots, the image formation by small dots is enabled in a highlight area where the granularity is more significant, producing the effect of greatly reducing the sense of granularity. On the other hand, since the image formation with the medium and large dots is enabled in a shadow area, there is the advantage that sufficient density can be secured. To accomplish the higher image quality for both the highlight and shadow areas, the combined use of large, medium and small dots is very effective.

Figure 3:
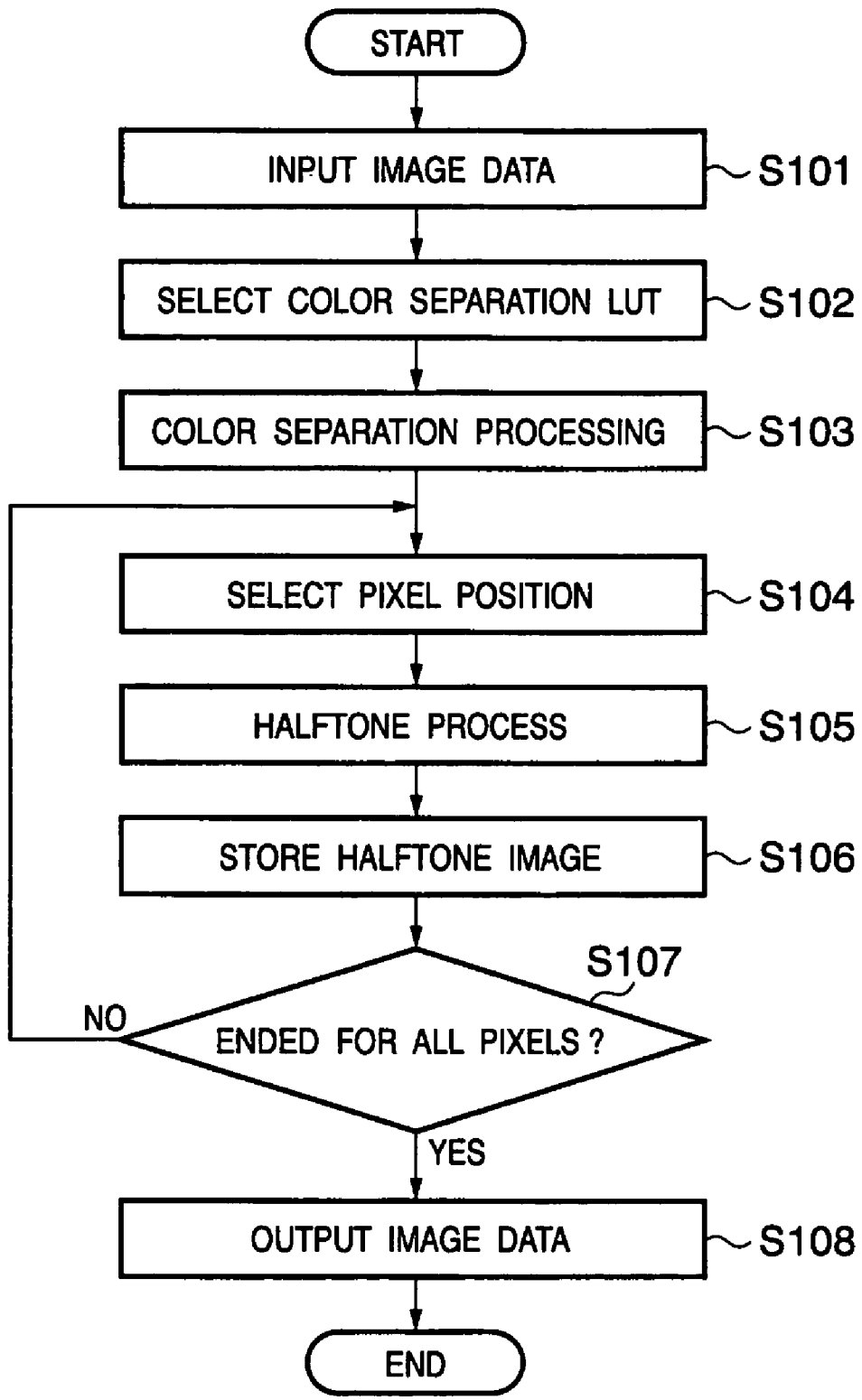
FIG. 3 is a flowchart showing a process in the image processing apparatus of FIG. 1.

Referring to a flowchart of FIG. 3, the operation of the image processing apparatus 1 with the above functional configuration according to this embodiment will be described below.

First of all, the color input image data with multiple gradations is inputted from the input terminal 101, and stored in the image buffer 102 (step S101). The input image data represents a color image by three color components of red (R), green (G) and blue (B).

Next, the color separation LUT separation part 105 selects one LUT from among plural kinds of LUTs held within the color separation LUT 104. In selecting the LUT, the color separation LUT separation part 105 displays a user interface (UI) as shown in FIG. 4 on a display (not shown) of the personal computer, whereby the user selects a desired print form. The user can select one desired print speed by a print speed radio button 401 on the UI, and one desired image quality by an image quality radio button 402. The "granularity" in the item of the image quality radio button 402 means the "coarseness of image", and the "granularity oriented" means suppressing the coarseness of image as much as possible. Also, the "banding" means the "streak or blotch of image", and the "banding oriented" means suppressing the streak and blotch as much as possible. If the user selects the above two items and depresses an OK button 403, the color separation LUT selection part 105 selects the LUT corresponding to a selected state with the UI.

Figure 5:
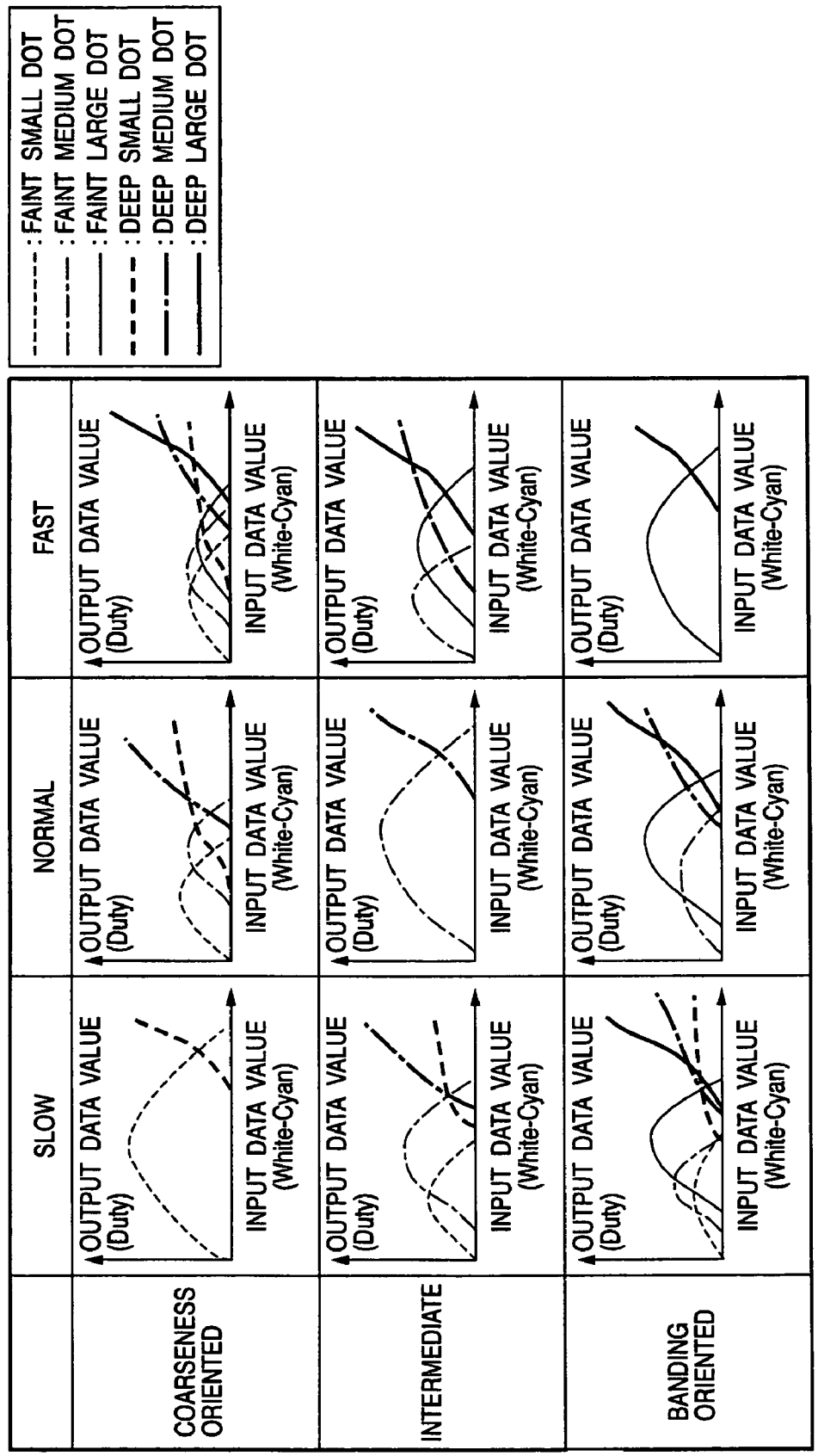
FIG. 5 is a view showing an example of the color separation LUT.

FIG. 5 shows one example of the LUT selected according to a specification of the UI in FIG. 4. For the sake of simplification, the table of FIG. 5 shows only the color separation LUT for cyan. As shown in FIG. 5, for the "granularity oriented", a greater amount of small dots is set to use, or conversely, for the "banding oriented", a greater amount of large dots is set to use. This is because the small dot is effective to suppress coarseness of the image, and the large dot is effective to suppress streak and blotch in the image. Further, as the print speed is slower, a greater amount of faint dots is set to use. Its reason is that the ink absorption amount of the paper is increased in the case where the "printing can be slow", and more faint dots favorable in terms of image quality can be used. On the other hand, as the print speed is "faster", a greater amount of deep dots is set to use. Its reason is that the ink absorption amount of the paper is decreased in the case where the "printing must be fast", and more deep dots must be used to fill space with less ink amount.

Next, the color separation processing part 103 performs the color separation processing for color input image data with multiple gradations stored in the image buffer 102, using the LUT selected by the color separation LUT selection part 105 (step S103). In this processing, the color separation processing part 103 performs the color separation for the color input image data from RGB into the ink color planes of CMYK and LcLm, and the planes of large, medium and small dots having different discharge amounts for each color.

The recording head of the first embodiment possesses three kinds of dots, large, medium and small, for each of six kinds of ink colors. Therefore, the color input image data of RGB is converted into the image data of a total of 18 planes including the planes of CMYKLcLm with large, medium and small dots. That is, the image data with 18 kinds of planes corresponding to 18 kinds of recording modes is generated. The details of the color separation processing will be described later.

Next, the halftone processing part 106 performs a pixel position selection process for the halftone process (step S104), and performs the halftone process for conversion into a smaller number of gradations (step S105). In this embodiment, each pixel data of the input image is separated into the planes with a gradation value of 8 bits by the color separation processing part 103. And the halftone processing part 106 converts the planes obtained by the color separation processing part 103 into data (binary data) with gradation value of two levels. The halftone process of the first embodiment involves converting the multi-value input image data into the binary image (or the image having two or more values with a smaller number of gradations than the input number of gradations) based on an error diffusion method. The details of the halftone processing part 106 of this embodiment will be described later.

The binary image data after the above halftone process is stored in the halftone image storage memory 107 (step S106). FIG. 6 is a view showing an organization example of a plane 61 corresponding to each recording mode inputted into the halftone processing part 106 and the binary image data 62 stored in the halftone image storage memory 107. The color separation processing part 103 generates each pixel value of the plane 61 (multi-value image data) where the multi-value (8-bit) data is arranged in a two-dimensional storage area I(x,y) having the same transverse and longitudinal numbers of pixels as the transverse number W of pixels and the longitudinal number H of pixels for the input image. The halftone processing part 106 generates the binary data at each pixel position on the plane for each color and each dot size by performing a gradation conversion process for the plane 61. The halftone image storage memory 107 stores the binary image data corresponding to each pixel position in a two-dimensional storage area O(x,y) having the same transverse and longitudinal numbers of pixels as the transverse number W of pixels and the longitudinal number H of pixels for the input image. As will be seen from a configuration of FIG. 8, the binary image data corresponding to each recording mode is generated by inputting the corresponding pixels on each plane successively in this embodiment. Accordingly, it is unnecessary to prepare a memory space for holding the entire plane 61 of the multi-value image. Also, for the halftone image storage memory 107, a memory space of the size required for the recording operation in units of band may be prepared.

The image data after the halftone process stored in the halftone image storage memory 107 is outputted as an output dot pattern from the image data output terminal 108 (step S108). The printer 2 receives the image data outputted from the image data output terminal 108, and forms the image by selecting the ink color and the discharge amount in accordance with the image data. In forming the image, the printer 2 records the image on the recording medium by driving each nozzle at regular drive intervals while moving the recording head 201 from left to right relative to the recording medium. If one time of scanning is ended, the recording head is returned to the left end, and the recording medium 202 is conveyed by a fixed amount. The image is formed by repeating the above process.

With the above, a series of image forming processes for the color input image data with multiple gradations are completed.

Figure 7:
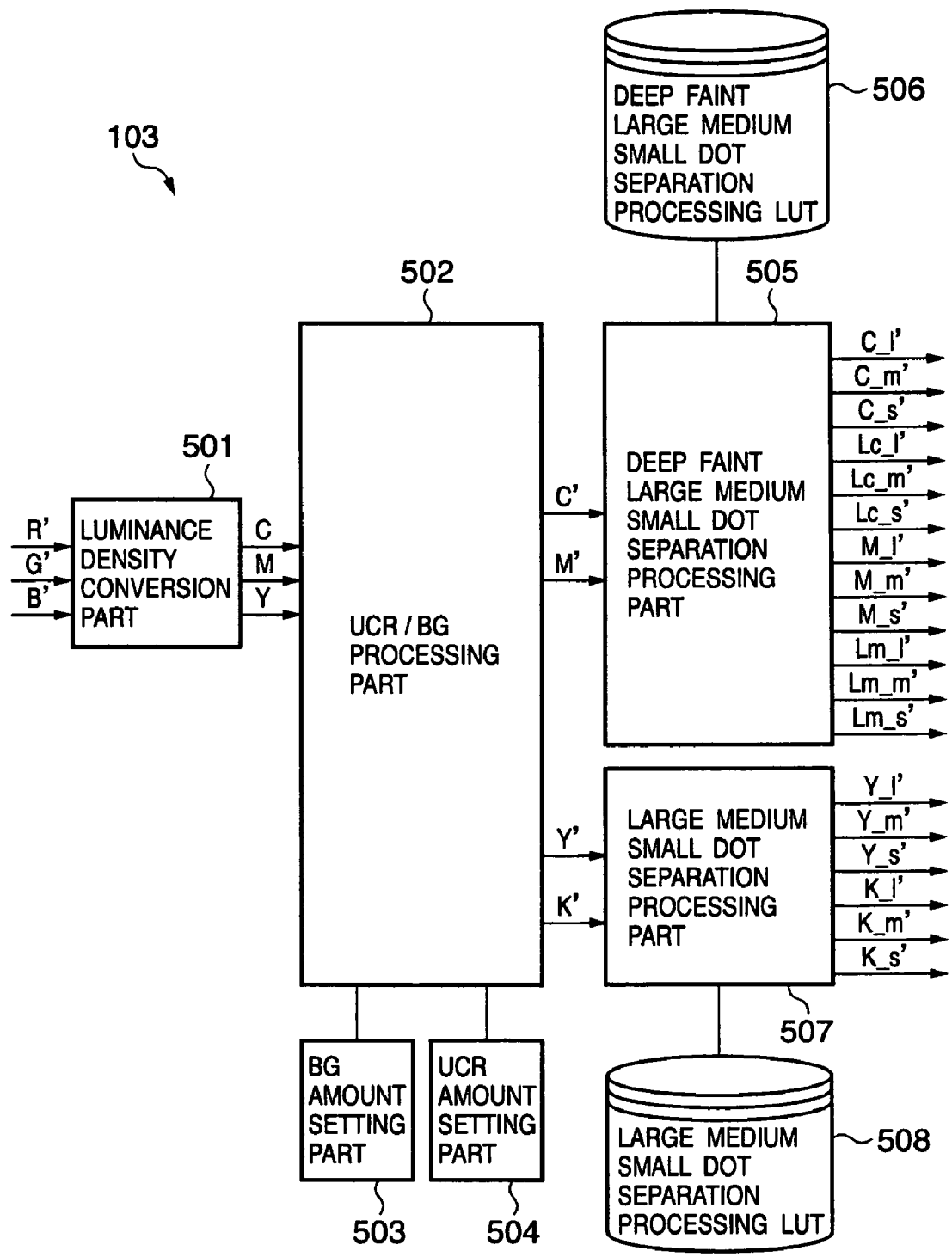
FIG. 7 is a view showing the details of the configuration of a color separation processing part.

Referring to FIG. 7, the color separation process of this embodiment will be described below in detail. FIG. 7 shows the configuration of the color separation processing part 103 in the image processing apparatus 1. A deep, faint, large, medium and small dot separation processing LUT 506 and a large, medium and small separation processing LUT 508 are included in the color separation LUT 104.

First of all, a luminance density conversion part 501 converts the data of an RGB color space into the data of a CMY color space. That is, the input image data R'G'B' with luminance information of 8 bits is converted into CMY based on the following expressions (1) to (3).

$$C = -\alpha \log(R'/255) \quad (1)$$

$$M = -\alpha \log(G'/255) \quad (2)$$

$$Y = -\alpha \log(B'/255) \quad (3)$$

Where $\alpha$ is an arbitrary real number.

Next, a UCR/GB processing part 502 converts the CMY data into the CMYK data with $\beta(\text{Min}(C,M,Y), \mu)$ set in a BG setting part 503 and the value $\mu$ set in a UCR amount setting part 504 in accordance with the following expressions.

$$C' = C - (\mu/100) \times \text{Min}(C,M,Y) \quad (4)$$

$$M' = M - (\mu/100) \times \text{Min}(C,M,Y) \quad (5)$$

$$Y' = Y - (\mu/100) \times \text{Min}(C,M,Y) \quad (6)$$

$$K' = \beta(\text{Min}(C,M,Y), \mu) \times (\mu/100) \times \text{Min}(C,M,Y) \quad (7)$$

Where $\beta(\text{Min}(C,M,Y), \mu)$ is the real number varying with Min(C,M,Y) and $\mu$, and the use method of K ink can be set by this value.

Subsequently, a deep, faint, large, medium and small dot separation processing part 505 performs the deep and faint ink separation and the large, medium and small dot separation for two colors of C' and M' having two different ink densities by referring to the deep, faint, large, medium and small dot separation processing LUT 506 in accordance with the following expressions.

$$C\_l' = C\_l(C') \quad (8)$$

$$C\_m' = C\_m(C') \quad (9)$$

$$C\_s' = C\_s(C') \quad (10)$$

$$Lc\_l' = Lc\_l(C') \quad (11)$$

$$Lc\_m' = Lc\_m(C') \quad (12)$$

$$Lc\_s' = Lc\_s(C') \quad (13)$$

$$M\_l' = M\_l(M') \quad (14)$$

$$M\_m' = M\_m(M') \quad (15)$$

$$M\_s' = M\_s(M') \quad (16)$$

$$Lm\_l' = Lm\_l(M') \quad (17)$$

$$Lm\_m' = Lm\_m(M') \quad (18)$$

$$Lm\_s' = Lm\_s(M') \quad (19)$$

C_l', C_m', C_s', Lc_l', Lc_m' and Lc_s' designate the output data values of cyan large dot, cyan medium dot, cyan small dot, faint cyan large dot, faint cyan medium dot and faint cyan small dot after the separation into deep, faint, large, medium and small dots, respectively. Similarly, for magenta, M_l', M_m', M_s', Lm_l', Lm_m' and Lm_s' designate the output data values of magenta large dot, magenta medium dot, magenta small dot, faint magenta large dot, faint magenta medium dot and faint magenta small dot, respectively. The functions as defined in the right side of the expressions (8) to (19) correspond to the deep, faint, large, medium and small dot separation processing LUT 506.

On the other hand, two colors of Y' and K' have no faint ink. Accordingly, the large, medium and small dot separation processing part 507 without having the deep and faint ink separation process performs the large, medium and small dot separation process by referring to the large, medium and small dot separation processing LUT 508 in accordance with the following expressions.

$$Y\_l' = Y\_l(Y') \quad (20)$$

$$Y\_m' = Y\_m(Y') \quad (21)$$

$$Y\_s' = Y\_s(Y') \quad (22)$$

$$K\_l' = K\_l(K') \quad (23)$$

$$K\_m' = K\_m(K') \quad (24)$$

$$K\_s' = K\_s(K') \quad (25)$$

Y_l', Y_m', Y_s', K_l', K_m' and K_s' designate the output data values of yellow large dot, yellow medium dot, yellow small dot, black large dot, black medium dot and black small dot after the large, medium and small dot separation processing, respectively. The functions as defined in the right side of the expressions (20) to (25) correspond to the large, medium and small dot separation processing LUT 508.

The color separation process of the first embodiment is completed through the above processing steps.

Figure 8:
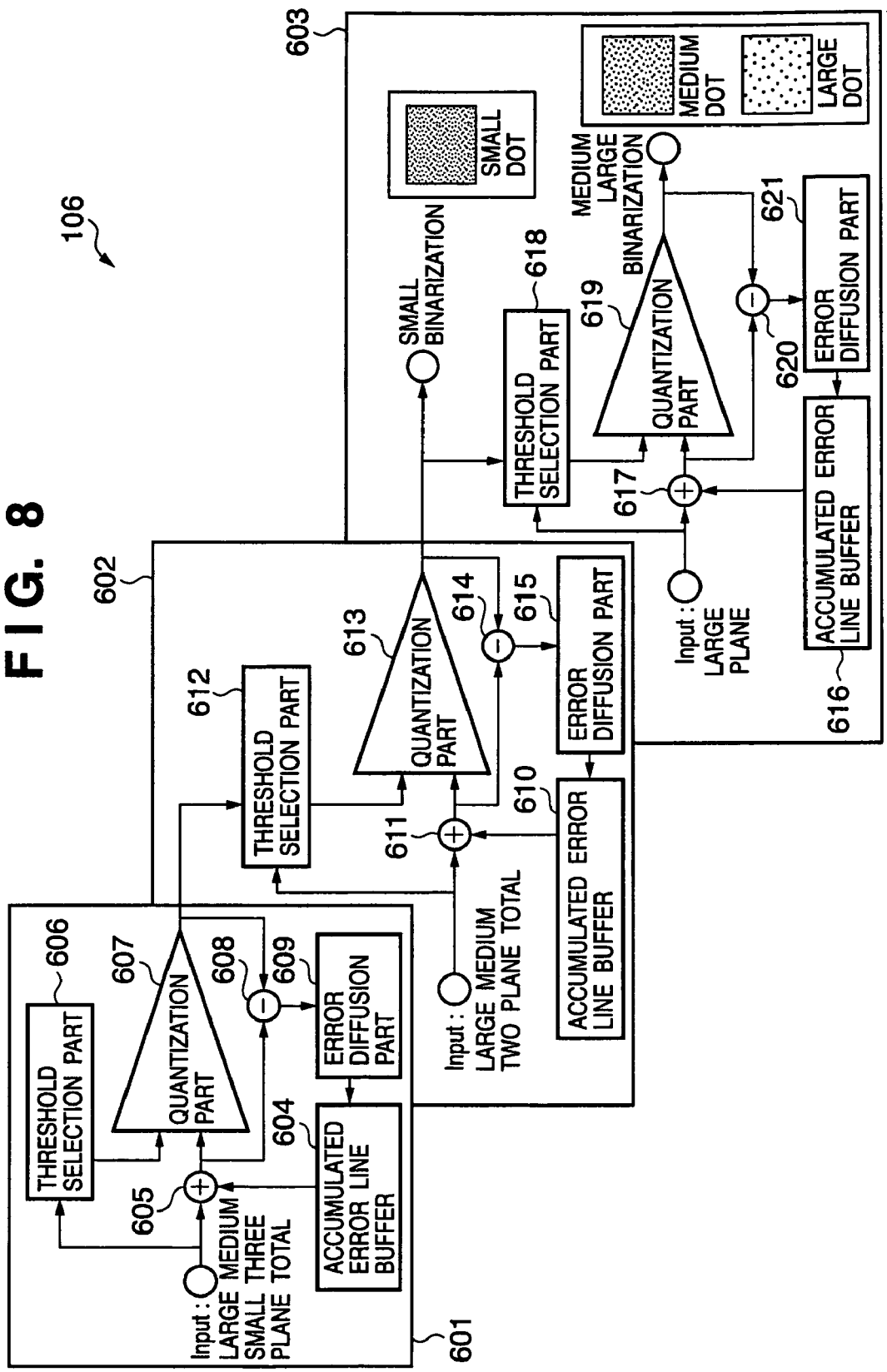
FIG. 8 is a block diagram showing the configuration of a halftone processing part according to a first embodiment of the invention.
Figure 13:
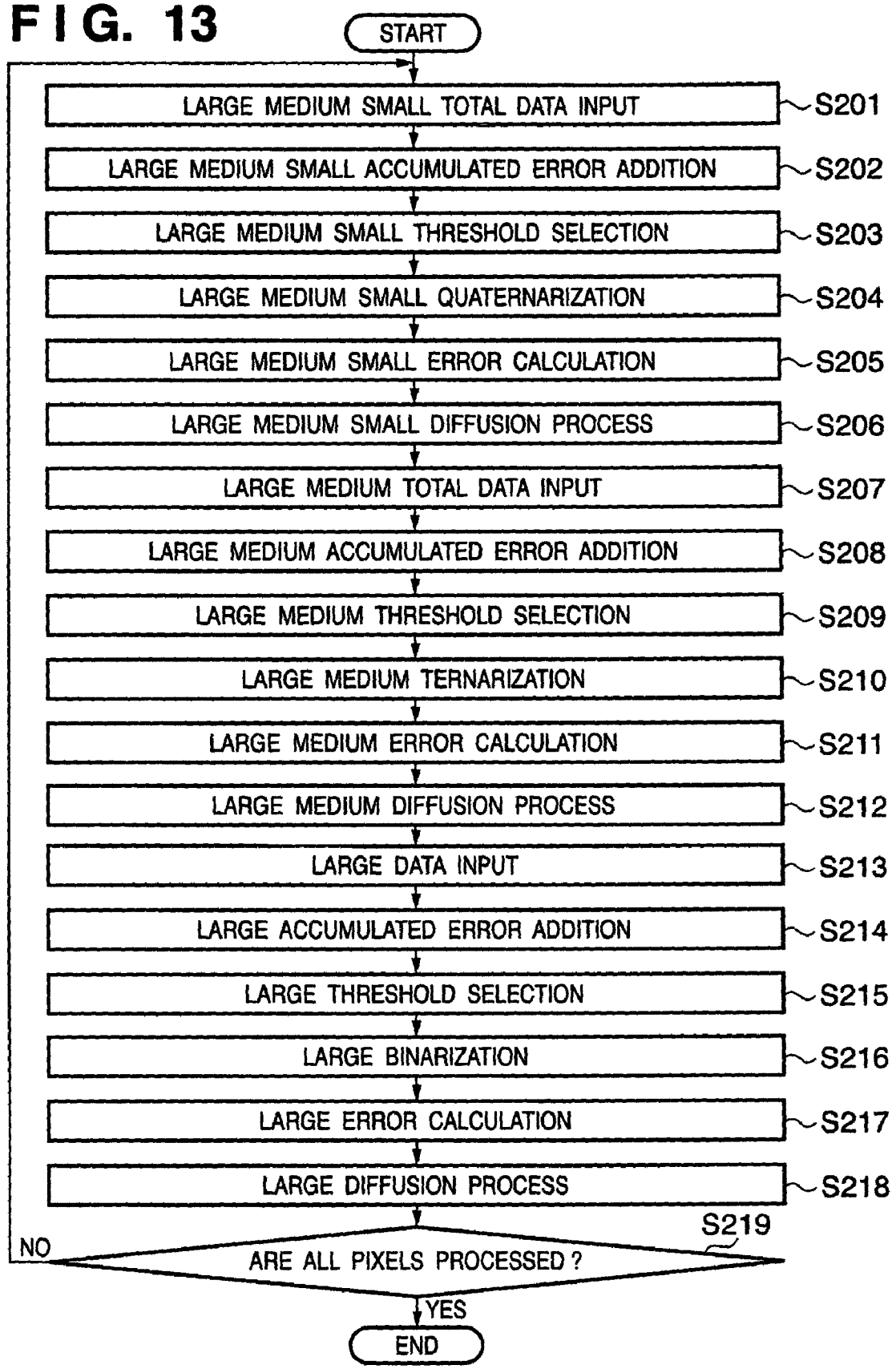
FIG. 13 is a flowchart showing a process of the halftone processing part according to the first embodiment.

Next, an error diffusion method for use in the halftone processing part 106 of the first embodiment will be described below. Each plane image after the color separation processing in this embodiment is 8-bit image of 0 to 255 as described above. In the first embodiment, a "high image quality process" for performing the error diffusion processing n times for n plane data will be described below. Herein, for the sake of simplifying the explanation, a pseudo gradation process through the error diffusion processing on the large, medium and small dot planes of cyan, C_l', C_m' and C_s' is taken as an example. FIG. 8 is a block diagram for explaining the functional configuration of the halftone processing part 106 according to the first embodiment. Also, FIG. 13 is a flowchart for explaining the operation of the halftone processing part 106. A part or all of the configuration as shown in FIG. 8 may be implemented by software.

When the data of large, medium and small three dot planes (each plane takes the value of 0 to 255) is binarized (quantized values of 0 and 255), a quaternarization part 601 firstly inputs the total data I_lms of corresponding pixels on three dot planes of large, medium and small. And the quaternarization (quantized values of 0, 255, 510 and 765) is performed by performing the error diffusion processing for the input I_lms.

More specifically, first of all, at step S201, the quaternarization part 601 inputs the total data I_lms of pixel values of corresponding pixels (noticed pixels) on the large, medium and small dot planes. Herein, I_lms is calculated in accordance with the following expression.

$$I\_lms = C\_l' + C\_m' + C\_s' \quad (26)$$

Figure 9:
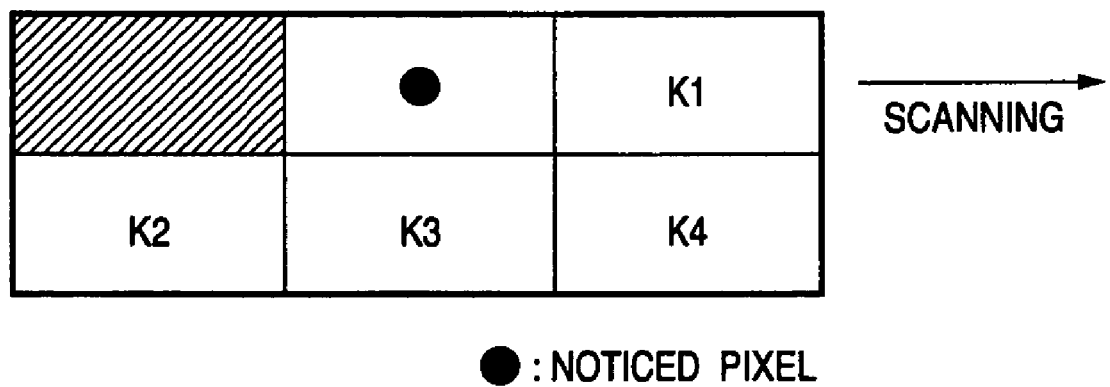
FIG. 9 is a view showing one example of error diffusion coefficients.
Figure 10A:
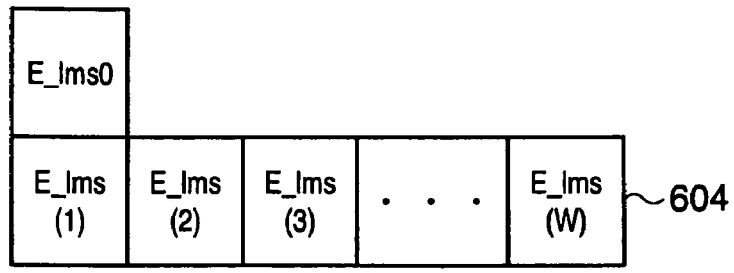
FIGS. 10A to 10E are views showing the organization examples of an accumulated error line buffer.

In this embodiment, it is assumed that the error diffusion coefficients for the error diffusion processing are four coefficients of K1 to K4, as shown in FIG. 9. For example, it is assumed that K1 is equal to 7/16, K2 is equal to 3/16, K3 is equal to 5/16 and K4 is equal to 1/16. To diffuse and accumulate the error with these error diffusion coefficients, an accumulated error line buffer 604 in the quaternarization part 601 has the configuration as shown in FIG. 10A. That is, it has one storage area E_lms0, and the storage areas E_lms(x) (x=1 to W) the number of which is equal to the transverse pixel number W of the input image, and stores a quantization error by a method as will be described later. The accumulated error line buffer 604 may be entirely initialized to an initial value 0 before starting the processing, or initialized to the random value.

At step S202, an accumulated error addition part 605 adds an error E_lms(x) corresponding to the transverse pixel position x of the noticed pixel by reading it from the accumulated error line buffer 604. That is, assuming that the input total data is I_lms and the data after adding the accumulated error is I_lms', $$I\_lms' = I\_lms + E\_lms(x) \quad (27)$$

At step S203, a threshold selection part 606 selects a threshold T_lms. The threshold T_lms is set up in accordance with the input pixel data I_lms as follows.

$$T\_lms(I\_lms) = 128 \ (0 \leq I\_lms \leq 255) \quad (28)$$

$$T\_lms(I\_lms) = 384 \ (255 < I\_lms \leq 510) \quad (29)$$

$$T\_lms(I\_lms) = 640 \ (510 < I\_lms \leq 765) \quad (30)$$

Or to avoid a dot generation delay, the threshold T_lms may be changed minutely in accordance with the input pixel data I_lms to reduce the average quantization error.

At step S204, a quantization part 607 decides an output pixel value Out_lms by comparing the pixel data I_lms' after addition of error with the threshold T(I_lms). The rules are as follows.

$$Out\_lms = 0 \quad (31)$$

$(0 \leq I\_lms \leq 255, I\_lms' < T(I\_lms))$ $$Out\_lms = 255 \quad (32)$$

$(0 \leq I\_lms \leq 255, I\_lms' \geq T(I\_lms))$ or
$(255 < I\_lms \leq 510, I\_lms' < T(I\_lms))$ $$Out\_lms = 510 \quad (33)$$

$(255 \leq I\_lms \leq 510, I\_lms' \geq T(I\_lms))$ or
$(510 < I\_lms \leq 765, I\_lms' < T(I\_lms))$ $$Out\_lms = 765 \quad (34)$$

$(510 < I\_lms \leq 765, I\_lms' \geq T(I\_lms))$

Herein, the meaning of quaternarizing the total value (I_lms) of the noticed pixels on the large, medium and small three dot planes will be explained below. For example, Out_lms=255 means that any one of large, medium and small dots is shot at that location, as shown in the expression (32). That is, Out_lms=255 means that the large dot is not necessarily settled at that location, and neither the medium dot nor the small dot are settled. At this time, it is settled that at least one of the large, medium and small dots is shot although it is unknown which of large, medium and small dots is shot.

Similarly, Out_lms=510 means that any two of large, medium and small dots are shot at that location. At this time, it is settled that at least two of the large, medium and small dots are shot although it is unknown which of large, medium and small dots are shot. However, the same dot can be shot only once.

The above is summarized as follows.

Out_lms=0 . . . It is settled that none of large, medium and small dots is shot.

Out_lms=255 . . . Any one of large, medium and small dots is shot.

Out_lms=510 . . . Any two of large, medium and small dots are shot. However, the same dot is not shot twice.

Out_lms=765 . . . Any three of large, medium and small dots are shot. However, the same dot is not shot twice. That is, it is settled that all of the large, medium and small dots are necessarily shot.

At step S205, an error calculation part 608 calculates a difference Err_lms between the pixel data I_lms' after addition of error to the total value I_lms of the noticed pixels and the output pixel value Out_lms in the following way.

$$Err\_lms(x) = I\_lms' - Out\_lms \quad (35)$$

And at step S206, an error diffusion part 609 performs a diffusion process for the error Err_lms(x) in accordance with the transverse pixel position x in the accumulated error line buffer 604 in the following way.

$$E\_lms(x+1) \leftarrow E\_lms(x+1) + Err\_lms(x) \times 7/16 \ (x<W)$$

$$E\_lms(x-1) \leftarrow E\_lms(x-1) + Err\_lms(x) \times 3/16 \ (x>1)$$

$$E\_lms(x) \leftarrow E\_lms0 + Err\_lms(x) \times 5/16 \ (1<x<W)$$

$$E\_lms(x) \leftarrow E\_lms0 + Err\_lms(x) \times 8/16 \ (x=1)$$

$$E\_lms(x) \leftarrow E\_lms0 + Err\_lms(x) \times 13/16 \ (x=W)$$

$$E\_lms0 \leftarrow E\_lms \times 1/16 \ (x<W)$$

$$E\_lms0 \leftarrow 0 \ (x=W) \quad (36)$$

With the above, the quaternarization of the three plane total data of one pixel for large, medium and small dots of cyan, C_l', C_m' and C_s' is completed. Through the quaternarization process of the total data for three planes of large, medium and small dots, the optimal arrangement is secured with at least three planes in total, although it is unknown which dot on three dot planes is shot.

Next, a ternarization part 602 performs the ternarization (quantized values of 0, 255 and 510) by performing the error diffusion process for the total data I_lm of pixel values of the noticed pixels on large and medium two dot planes.

First of all, at step S207, the total data I_lm is inputted into the ternarization part 602. I_lm is calculated in the following way.

$$I\_lm = C\_l' + C\_m' \quad (37)$$

Figure 10B:
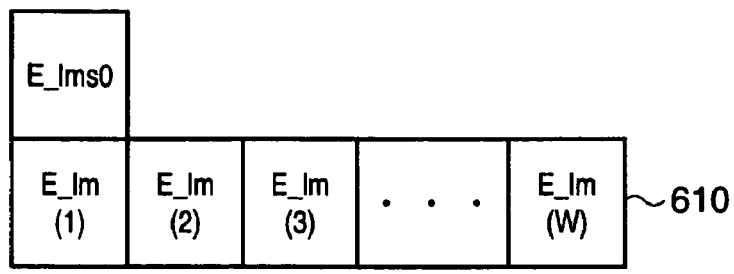

An accumulated error line buffer 610 in the ternarization part 602 of FIG. 8 has the same configuration as the accumulated error line buffer 604. That is, the accumulated error line buffer 610 has one storage area E_lm0, and the storage areas E_lm(x) (x=1 to W) the number of which is equal to the transverse pixel number W of the input image, as shown in FIG. 10B, and stores a quantization error by a method as will be described later. The accumulated error line buffer 610 may be entirely initialized to an initial value 0 before starting the processing, or initialized to the random value.

At step S208, an accumulated error addition part 611 adds an error E_lm(x) corresponding to the transverse pixel position x of the noticed pixel. That is, assuming that the input total value of the noticed pixel is I_lm and the data after adding the accumulated error is I_lm', $$I\_lm'=I\_lm+E\_lm(x) \quad (38)$$

At step S209, a threshold selection part 612 selects a threshold T_lm. In selecting the threshold T_lm, putting $$t\_lm=I\_lms-I\_lm \quad (39)$$

the threshold T_lm is set as $$T\_lm(t\_lm)=128 \ (0 \leq t\_lm \leq 255) \quad (40)$$

To avoid a dot generation delay, the threshold T_lm(t_lm) may be changed minutely in accordance with t_lm to reduce the average quantization error. Since I_lms–I_lm is always 255 or less, T_lm(t_lm) is necessarily equal to 128 in this embodiment.

At step S210, a quantization part 613 compares the pixel data I_lm' after addition of error, the threshold T(t_lm) and the multivalued result Out_lms of the above three dot planes. And it decides an output pixel value Out_lm (ternary value) and the small dot final result Out_s, based on the comparison result. The rules are as follows.

$$\text{When Out}\_lms-I\_lm' \geq T(t\_lm) \quad (41)$$

$$Out\_lm=Out\_lms-255 \quad (42)$$

$$Out\_s=255 \quad (43)$$

$$\text{When Out}\_lms-I\_lm' < T(t\_lm) \quad (44)$$

$$Out\_lm=Out\_lms \quad (45)$$

$$Out\_s=0 \quad (46)$$

For example, when Out_lms=765, Out_lms–I_lm'≧T (t_lm), whereby the condition of expression (41) holds, and Out_lm=510. In this way, the ternarization (quantized values of 0, 255 and 510) for the total data of large and medium two dot planes is decided in the expressions (41) to (46). At the same time, the binarization (quantized values of 0 and 255) for the small dot plane (Out_s) is decided. That is, the binary data of the small dot plane is settled at this time. The expression (43) means that the small dot is shot and the expression (46) means that the small dot is not shot.

Herein, the meaning of ternarizing the total value (I_lm') of the large and medium two dot planes will be explained below. For example, Out_lm=255 means that any one of large and medium dots is shot at that location. That is, Out_lm=255 means that the large dot is not necessarily settled at that location, and the medium dot is not also settled. At this time, it is settled that at least one of the large and medium dots is shot although it is unknown which of large and medium dots is shot.

Moreover, Out_lms=510 means that any two of large and medium dots are shot at that location. On the premise that the same dot can be shot only once, it is meant that both the large and medium dots are shot.

The above is summarized as follows.

Out_lm=0 . . . It is settled that none of large and medium dots is shot.

Out_lm=255 . . . Any one of large and medium dots is shot.

Out_lm=510 . . . Any two of large and medium dots are shot. However, the same dot is not shot twice. That is, it is settled that the large and medium dots are necessarily shot.

At step S211, an error calculation part 614 calculates a difference Err_lm between the pixel data I_lm' after addition of error to the noticed pixel I_lm and the output pixel value Out_lm in accordance with the following expression (47).

$$Err\_lm(x)=I\_lm'-Out\_lm \quad (47)$$

At step S212, an error diffusion part 615, like the error diffusion part 609, performs a diffusion process for the error Err_lm(x) in accordance with the transverse pixel position x of the noticed pixel in the accumulated error line buffer 610 in the following way.

$$E\_lm(x+1) \leftarrow E\_lm(x+1)+Err\_lm(x) \times 7/16 (x<W)$$

$$E\_lm(x-1) \leftarrow E\_lm(x-1)+Err\_lm(x) \times 3/16 (x>1)$$

$$E\_lm(x) \leftarrow E\_lm0+Err\_lm(x) \times 5/16 (1<x<W)$$

$$E\_lm(x) \leftarrow E\_lm0+Err\_lm(x) \times 8/16 (x=1)$$

$$E\_lm(x) \leftarrow E\_lm0+Err\_lm(x) \times 13/16 (x=W)$$

$$E\_lm0 \leftarrow E\_lm \times 1/16 (x<W)$$

$$E\_lm0 \leftarrow 0 (x=W) \quad (48)$$

With the above, the ternarization (quantized values of 0, 255 and 510) of the total data for two planes of one pixel for large and medium deep cyan dots, C_l' and C_m', is completed. At the same time, the binarization (quantized values of 0 and 255) result of the small deep cyan dot C_s' is settled.

The ternarization of the total data for large and medium two dot planes aims at securing the optimal arrangement with a total of at least two planes, although it is unknown which dot on two dot planes is shot. And as a remainder of the optimal arrangement, the binarization result of remaining one dot plane (small dot C_s') is settled. That is, the large and medium dots are optimally arranged, and consequently the small dot is arranged at the remaining position after the large and medium dots are optimally arranged. The reason for this arrangement is that the visually more excellent image can be obtained by optimally arranging the large and medium dots preferentially than optimally arranging the visually less conspicuous small dot.

Next, the binarization is performed by performing the error diffusion processing for the large dot plane data I_l. First of all, at step S213, the data I_l of the noticed pixel of large dot is inputted into the binarization part 603. I_l is calculated in the following way.

$$I\_l=C\_l' \quad (49)$$

Figure 10C:
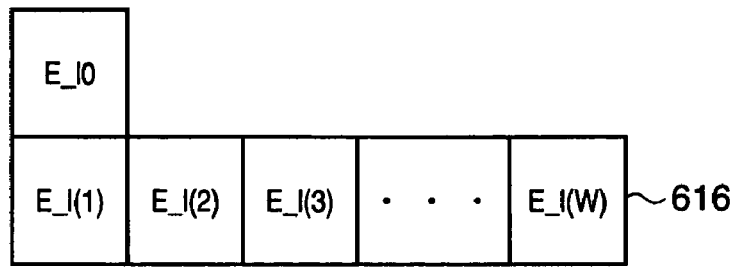

An accumulated error line buffer 616 in the binarization part 603 of FIG. 8 has the same configuration as the accumulated error line buffer 604. That is, the accumulated error line buffer 616 has one storage area E_l0, and the storage areas E_l(x) (x=1 to W) the number of which is equal to the transverse pixel number W of the input image, as shown in FIG. 10C, and stores a quantization error by a method as will be described later. The accumulated error line buffer 616 may be entirely initialized to an initial value 0 before starting the processing, or initialized to the random value.

At step S214, an accumulated error addition part 617 adds an error E_l(x) corresponding to the transverse pixel position x of the input pixel data. That is, assuming that the input data of the noticed pixel is I_l and the data after adding the accumulated error is I_l', $$I\_l'=I\_l+E\_l(x) \quad (50)$$

At step S215, a threshold selection part 618 selects a threshold T_l. In selecting the threshold T_l, putting $$t\_l = I\_lm - I\_l \quad (51A)$$

the threshold T_l is set as $$T\_l(t\_l) = 128 \ (0 \leq t\_l \leq 255) \quad (51B)$$

Or to avoid a dot generation delay, the threshold T_l may be changed minutely in accordance with t_l to reduce the average quantization error. Since I_lm−I_l is 255 or less, T_l (t_lm) is necessarily equal to 128 in this embodiment.

At step S216, a large quantization part 619 compares the pixel data I_l' after addition of error, the threshold T_l(t_l) and the multivalued result Out_lm (quantized values of 0, 255 and 510) for the total data of large and medium two dot planes. And it decides the final binarization result Out_m of medium dot and the final binarization result Out_l of large dot, based on the comparison result. The rules are as follows.

$$\text{When Out}\_lm - I\_l' \geq T(t\_l) \quad (52)$$

$$\text{Out}\_l = \text{Out}\_lm - 255 \quad (53)$$

$$\text{Out}\_m = 255 \quad (54)$$

$$\text{When Out}\_lm - I\_l' < T(t\_l) \quad (55)$$

$$\text{Out}\_l = \text{Out}\_lm \quad (56)$$

$$\text{Out}\_m = 0 \quad (57)$$

For example, when Out_lm=510, Out_lm−I_l'≧T(t_l), whereby the condition of expression (52) holds, and Out_l is equal to 255. In this way, the binarization for the large plane data Out_l is decided in the expressions (52) to (57), and at the same time, the binarization for the medium plane data Out_m is decided. That is, the final results Out_m and Out_l of medium dot and large dot are settled at the same time. The expression (54) means that the medium dot is shot and the expression (57) means that the medium dot is not shot.

At step S217, a large error calculation part 620 calculates a difference Err_l between the pixel data I_l' after addition of error to the noticed pixel I_l and the output pixel value Out_l in the following way.

$$Err\_l(x) = I\_l' - \text{Out}\_l \quad (57)$$

At step S218, an error diffusion part 621, like the error diffusion parts 604 and 615, diffuses the error. That is, it performs a diffusion process for the error Err_l(x) in accordance with the transverse pixel position x in the accumulated error line buffer 616 in the following way.

$$E\_l(x+1) \leftarrow E\_l(x+1) + Err\_l(x) \times 7/16 \ (x < W)$$

$$E\_l(x-1) \leftarrow E\_l(x-1) + Err\_l(x) \times 3/16 \ (x > 1)$$

$$E\_l(x) \leftarrow E\_l0 + Err\_l(x) \times 5/16 \ (1 < x < W)$$

$$E\_l(x) \leftarrow E\_l0 + Err\_l(x) \times 8/16 \ (x = 1)$$

$$E\_l(x) \leftarrow E\_l0 + Err\_l(x) \times 13/16 \ (x = W)$$

$$E\_l0 \leftarrow E\_l \times 1/16 \ (x < W)$$

$$E\_l0 \leftarrow 0 \ (x = W) \quad (58)$$

With the above, the binarization (quantized values of 0 and 255) of the large dot plane data C_l' of one pixel of cyan is completed. At the same time, the binarization (quantized values of 0 and 255) result of the medium dot plane data C_m' of one pixel of cyan is settled.

The above binarization of the large plane data aims at securing the optimal arrangement on the large plane. And as a remainder of the optimal arrangement of large dot, the binarization result of the medium dot is settled. That is, the large dot is optimally arranged, and consequently the medium dot is the remainder after the large dot is optimally arranged. The reason for this arrangement is that the visually more excellent image can be obtained by optimally arranging the large dots preferentially than optimally arranging the visually less conspicuous medium dot than the large dot. However, since the quaternarization part 601 firstly diffuses the error for the total data of the large, medium and small dot planes, the optimal arrangement is obtained as seen totally from the large, medium and small dots. Therefore, the optimal arrangement is obtained with the large, medium and small dots in total, and the optimal arrangement is obtained even with visually conspicuous large dot singly.

The dot position of each plane data can be decided by performing the steps S201 to S218 for all the pixels (step S219).

In summary, in the halftone process of the first embodiment, the error diffusion process is performed for the total value of corresponding pixels on the planes of large, medium and small dots, and then the arrangement of the value of large dot is preferentially decided. Accordingly, there are features of Optimal arrangement of large, medium and small dots totally Optimal arrangement of large dot singly Though the arrangement of large, medium and small dots of cyan has been described as the example of the halftone process in the above embodiment, any combination of other dots may be employed. In the flow of processing as described in this embodiment, the dot positions are decided through the "large, medium and small three planes quaternarization→large and medium two planes ternarization→large plane binarization" in the order of "small dot→medium dot→large dot". There are following examples of other processings. For example, The dot positions are decided through the "deep and faint cyan two planes ternarization→deep cyan one plane binarization" in the order of "faint cyan→deep cyan".

The dot positions are decided through the "cyan and magenta two planes ternarization→magenta plane binarization" in the order of "cyan→magenta".

Moreover, the halftone process may be applied to all the color separation planes. That is, the dot positions are decided through the "CMYK four planes quinarization→CMK three planes quaternarization→MK two planes ternarization→K plane binarization" in the order of "Y→C→M→K". Also, the halftone process may be applied to all the eighteen planes as described in FIG. 7. Or the arrangement of large, medium and small dots may be decided through the process for each color as described in the embodiment.

Since the later decided dot is more optimally arranged in any combination, the processing order is set up such that the dot with "larger dot diameter" and "higher density" (dot with higher priority of arrangement) may be decided later.

Second Embodiment

In the first embodiment, the halftone processing part 106 performs the error diffusion process n times for n pieces of plane data. In the second embodiment, the process of the first embodiment is positioned as the "high image quality process". And in the second embodiment, the halftone processing part 106 enables the "fast processing" for quantization by performing the error diffusion less than n times until the final dot arrangement of n planes is acquired. The configuration except for the halftone processing part 106 is the same as in the first embodiment.

Figure 11:
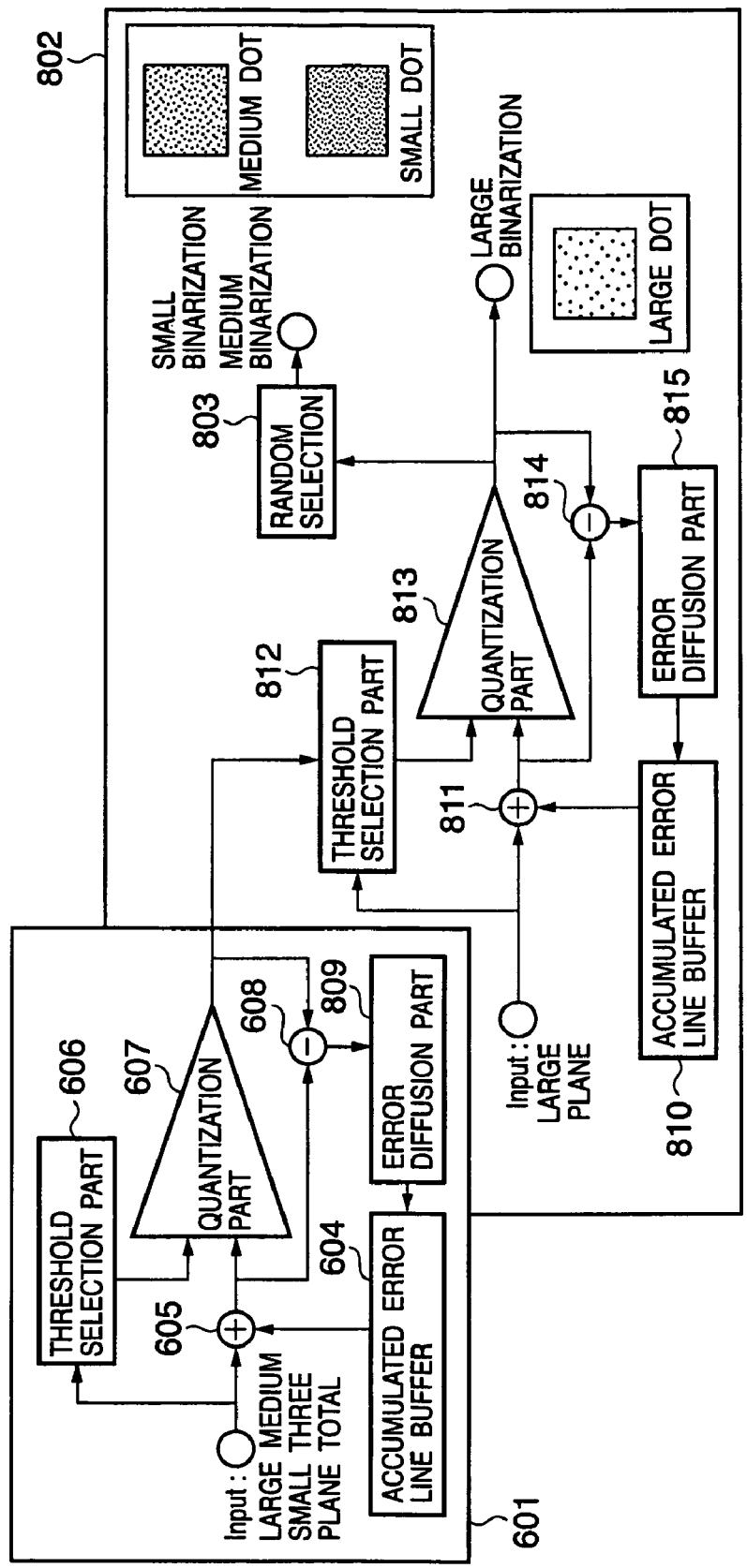
FIG. 11 is a block diagram showing the configuration of a halftone processing part according to a second embodiment of the invention.
Figure 14:
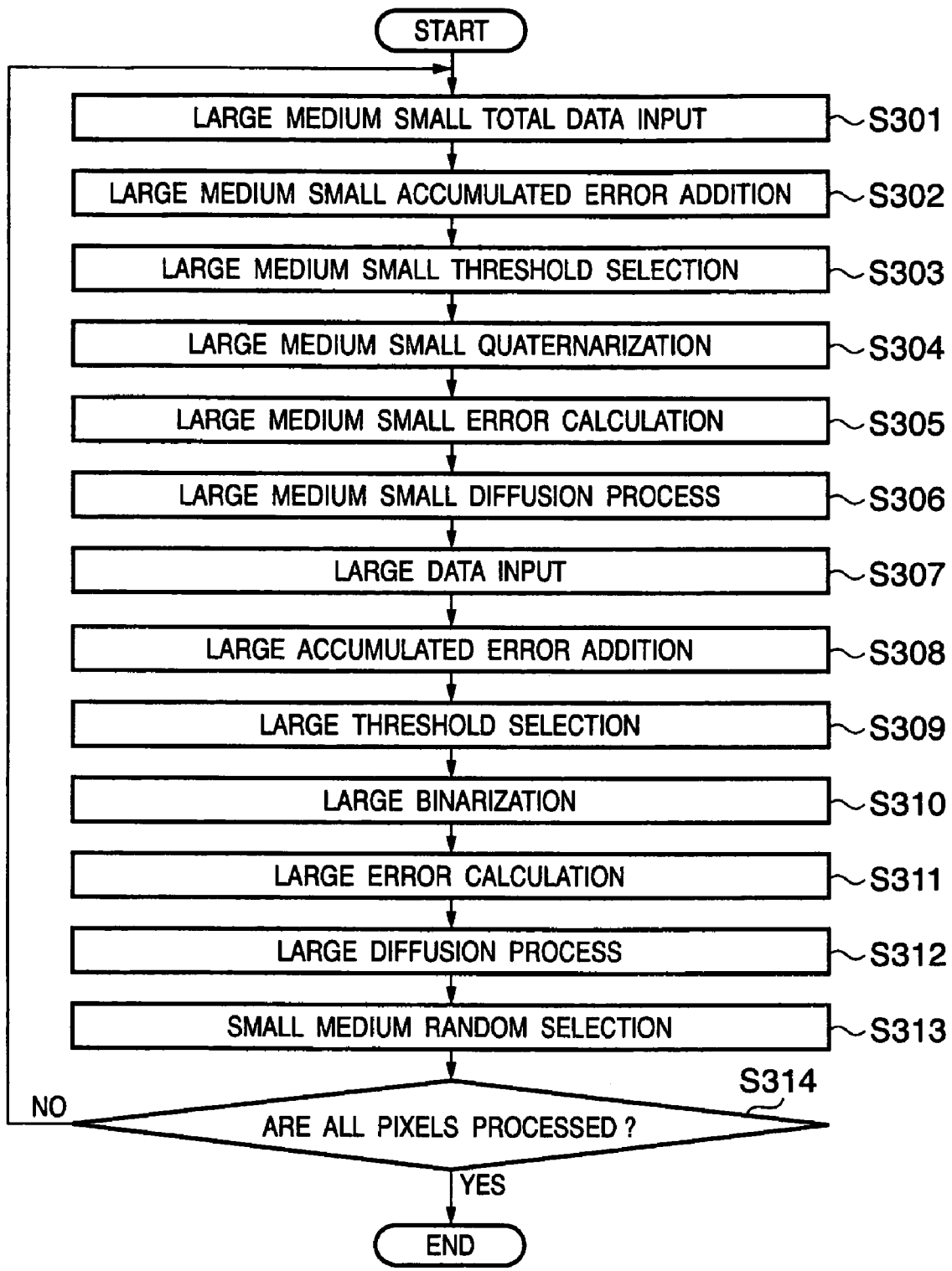
FIG. 14 is a flowchart showing a process of the halftone processing part according to the second embodiment.

First of all, for the sake of simplifying the explanation, the error diffusion for the large, medium and small three dot planes of cyan, C_l', C_m' and C_s', as in the first embodiment, is taken as an example. Referring to a block diagram of FIG. 11 and a flowchart of FIG. 14, the operation of the second embodiment will be described below. FIG. 11 is a block diagram for explaining the configuration of the halftone processing part 106 according to the second embodiment. Also, FIG. 14 is a flowchart for explaining the operation of the halftone processing part 106 according to the second embodiment.

When the data of large, medium and small three dot planes is binarized (quantized values of 0 and 255), the quaternarization part 601 firstly quaternarizes the total data of large, medium and small three planes at steps S301 to S306. The operation of the quaternarization part 601 is equivalent to that as described in the first embodiment (steps S201 to S206), and is not described here.

The output from the quaternarization part 601 (quaternarization result for the total data of large, medium and small three dot planes of one pixel) is inputted into a binarization part 802 of FIG. 11. The binarization part 802 executes the binarization by performing the error diffusion processing for the large plane data I_l. First of all, at step S307, the large dot input data is inputted into the binarization part 802. Herein, I_l is calculated as follows.

$$I\_l = C\_l' \quad (59)$$

An accumulated error line buffer 810 in the binarization part 802 has the structure, as shown in FIG. 10C. That is, it has one storage area E_l0, and the storage areas E_l(x) (x=1 to W) the number of which is equal to the transverse pixel number W of the input image, and stores a quantization error by a method as will be described later. The accumulated error line buffer 810 may be entirely initialized to an initial value 0 before starting the processing, or initialized to the random value.

At step S308, an accumulated error addition part 811 adds an error E_l(x) corresponding to the transverse pixel position x of the input pixel data to the input large dot plane data. That is, assuming that the data after adding the accumulated error is I_l', the value of the input noticed pixel data I_l is $$I\_l' = I\_l + E\_l(x) \quad (60)$$

At step S309, a threshold selection part 812 selects a threshold T_l. Putting $$t\_l = I\_lms - I\_l \quad (61),$$

the threshold T_l is set as $$T\_l(t\_l) = 128 \ (0 \leq t\_l \leq 255)$$

$$T\_l(t\_l) = 384 \ (255 < t\_l \leq 510)$$

To avoid a dot generation delay, the threshold T_l may be changed minutely in accordance with t_l to reduce the average quantization error. Since I_lms−I_l is 510 or less, T_l (t_lm) is equal to 128 or 384 in this embodiment.

At step S310, a large quantization part 813 compares the pixel data I_l' after addition of error, the threshold T_l(t_l) and the multivalued (quantized values of 0, 255, 510 and 765) result Out_lms of the above total data of large, medium and small three planes. And it decides the ternarization Out_ms of the total data of small and medium planes and the final binarization result Out_l of large dot, based on the comparison result. The rules are as follows.

In the case where T_l(t_l)=384, $$\text{when Out\_}lms-I\_l' \geq T(t-1) \quad (62)$$

$$\text{Out\_}l = \text{Out\_}lms - 510 \quad (63)$$

$$\text{Out\_ms} = 510 \quad (64)$$

$$\text{when Out\_}lms-I\_l' < T(t\_l) \quad (65)$$

$$\text{Out\_}l = \text{Out\_}lms - 255 \quad (66)$$

$$\text{Out\_ms} = 255 \quad (67)$$

In the case where T_l(t_l)=128, $$\text{when Out\_}lms-I\_l' \geq T(t-1) \quad (68)$$

$$\text{Out\_}l = \text{Out\_}lms - 255 \quad (69)$$

$$\text{Out\_ms} = 255 \quad (70)$$

$$\text{when Out\_}lms-I\_l' < T(t\_l) \quad (71)$$

$$\text{Out\_l} = \text{Out\_lms} \quad (72)$$

$$\text{Out\_ms} = 0 \quad (73)$$

When T_l(t_l)=384, Out_lms−I_l'≧T(t_l) for Out_lms=765, whereby the condition of expression (62) holds, and Out_l is equal to 255. Also, for example, when T_l(t_l)=128, Out_lms−I_l'≧T(t_l) for Out_lms=510, whereby the condition of expression (68) holds, and Out_l is equal to 255. Therefore, the binarization for the large plane data is decided in accordance with the expressions (62) to (73), and at the same time, the ternarization (Out_ms) for the total value of small and medium two dot planes of is decided.

At step S311, an error calculation part 814 calculates a difference Err_l between the pixel data I_l' after addition of error to the noticed pixel I_l and the output pixel value Out_l in the following way.

$$Err\_l(x) = I\_l' - \text{Out\_}l \quad (74)$$

At step S312, an error diffusion part 815 performs the diffusion processing for the error Err_l(x) in accordance with the transverse pixel position x in the following way.

$$E\_l(x+1) \leftarrow E\_l(x+1) + Err\_l(x) \times 7/16 (x<W)$$

$$E\_l(x-1) \leftarrow E\_l(x-1) + Err\_l(x) \times 3/16 (x>1)$$

$$E\_l(x) \leftarrow E0\_l + Err\_l(x) \times 5/16 (1<x<W)$$

$$E\_l(x) \leftarrow E0\_l + Err\_l(x) \times 8/16 (x=1)$$

$$E\_l(x) \leftarrow E0\_l + Err\_l(x) \times 13/16 (x=W)$$

$$E0\_l \leftarrow E\_l \times 1/16 (x<W)$$

$$E0\_l \leftarrow 0 (x=W) \quad (75)$$

With the above, the binarization (quantized values of 0 and 255) of the large dot plane data of one pixel is completed. At the same time, the ternarization (Out_ms: quantized values of 0, 255 and 510) of the total data of medium deep cyan dot C_m' and small deep cyan dot C_s' is completed.

Herein, the binarization of large dot plane data aims at securing the optimal arrangement on the large dot plane. And as a remainder of the optimal arrangement, the ternarization (Out_ms) of the total data of medium dot C_m' and small dot C_s' of cyan is settled. That is, the large dot is optimally arranged, and consequently the medium and small dots are the remainder after the large dot is optimally arranged. The reason for this arrangement is that the visually more excellent image can be obtained by optimally arranging the large dot preferentially than optimally arranging the visually less conspicuous small and medium dots.

Next, at step S313, a random selection part 803 converts the above ternarized data Out_ms (quantized values of 0, 255 and 510) into the binary data of medium dot and small dot. Specifically, the above ternarization result is distributed randomly at a Duty ratio of small to medium.

Specifically, the conditional expressions are as follows.

When Out_ms=510

Out_m=255

Out_s=255

When Out_ms=255 if $0 \leq Rnd\_ms \leq C\_m'/(C\_m'+C\_s')$

Out_m=255

Out_s=0 if $C\_m'/(C\_m'+C\_s') < Rnd\_ms \leq 1$

Out_m=0

Out_s=255 where Rnd_ms is the uniform random number in a range $0 \leq Rnd\_ms \leq 1$.

When Out_ms=0

Out_m=0

Out_s=0

Thus, the binarization (quantized values of 0 and 255) of the small dot plane data and the binarization (quantized values of 0 and 255) of the medium dot plane are completed. The halftone process of the second embodiment is completed by performing the above process for all the pixels (step S314).

With the second embodiment as described above, like the first embodiment, the error diffusion is firstly made for the large, medium and small total data, whereby the optimal arrangement is obtained as seen totally from the large, medium and small dots. Therefore, the optimal arrangement is obtained totally with the large, medium and small dots, and singly with the large dot that is visually conspicuous. With the second embodiment, the error diffusion processing required for deciding the dot position of three plane data is performed twice. That is, the dot arrangement is not much different from the first embodiment, but the fast processing is realized.

In the halftone process of the second embodiment, the dot positions are decided through the "large, medium and small three planes quaternarization→large two planes binarization→random medium and small binarization" in the order of "large→medium and small", but the halftone process may be applied to any combination of other planes. For example, The "dot positions of faint cyan and deep cyan" are decided through the "deep and faint cyan two planes ternarization→random deep and faint binarization" at the same time.

The "dot positions of cyan and magenta" are decided through the "cyan and magenta two planes ternarization→random cyan and magenta binarization" at the same time.

Moreover, the halftone process may be applied to all of the color separation planes, as follows.

The dot positions are decided through the "CMYK four planes quinarization→MK two planes ternarization→K plane binarization→random C and Y binarization" in the priority order of "M→K→C and Y".

Also, three or more planes may be subjected to the random binarization. For example, the dot positions are decided through the "CMYK four planes quinarization→K one plane binarization→random C, M and Y frames binarization" in the priority order of "K→C, M and Y". Also, the number of executing the error diffusion processing is n−2, whereby the faster process can be realized.

At this time, the CMY quaternarized data Out_cmy (quantized values of 0, 255, 510 and 765) are binarized under the following conditions.

When Out_cmy=765

Out_c=255

Out_m=255

Out_y=255

When Out_ms=510 if $0 \leq Rnd\_cmy \leq (C'+M')/\{2(C'+M'+Y')\}$

Out_c=255

Out_m=255

Out_y=0 if $(C'+M')/\{2(C'+M'+Y')\} < Rnd\_cmy \leq (2C'+M'+Y')/\{2(C'+M'+Y')\}$

Out_c=255

Out_m=0

Out_y=255 if $(2C'+M'+Y')/\{2(C'+M'+Y')\} < Rnd\_cmy \leq 1$

Out_c=0

Out_m=255

Out_y=255

When Out_cmy=255 if $0 \leq Rnd\_cmy \leq C'/(C'+M'+Y')$

Out_c=255

Out_m=0

Out_y=0 if $C'/(C'+M'+Y') < Rnd\_cmy \leq (C'+M')/(C'+M'+Y')$

Out_c=0

Out_m=255

Out_y=0 if $(C'+M')/(C'+M'+Y') < Rnd\_cmy \leq 1$

Out_c=0

Out_m=0

Out_y=255

When Out_cmy=0

Out_c=0

Out_m=0

Out_y=0 where Rnd_cmy is the uniform random number in a range $0 \leq Rnd\_cmy \leq 1$, and C', M' and Y' designate the cyan Duty, magenta Duty and yellow Duty.

As described above, since any combination can be set up, the second embodiment is selected when it is desired to executes the binarization in the n plane process by performing the error diffusion process less than n times.

Third Embodiment

In the first embodiment, the optimal arrangement is made in the priority order of large dot, medium dot and small dot by performing a process of "large, medium and small three planes total quaternarization→large and medium two planes ternarization→large plane binarization" in sequence. This process is very effective if the priority order can be given to all the planes to be processed. For example, when the "dot diameter" or "dot density" is different, the priority order can be set to all the planes, whereby this process is very effective. However, when the "dot density" is equivalent, it is not possible to meet the requirement that the priority orders of plural kinds of dots are made identical. For example, when cyan and magenta dots with the same dot density are optimally arranged by the processing method of the first embodiment, any of them must be processed ahead. Owing to the features of the processing in the first embodiment, the earlier processed dot is closer to the optimal arrangement, whereby even in the same priority order (same density), if one is optimally arranged, it is difficult to say that the other is optimally arranged.

In the third embodiment, a processing method for optimally arranging the data of two or more dot planes with the same priority order (e.g., same dot density) in the halftone processing part 106 will be described below. The other parts than the halftone processing part 106 are the same as in the first embodiment.

Figure 12:
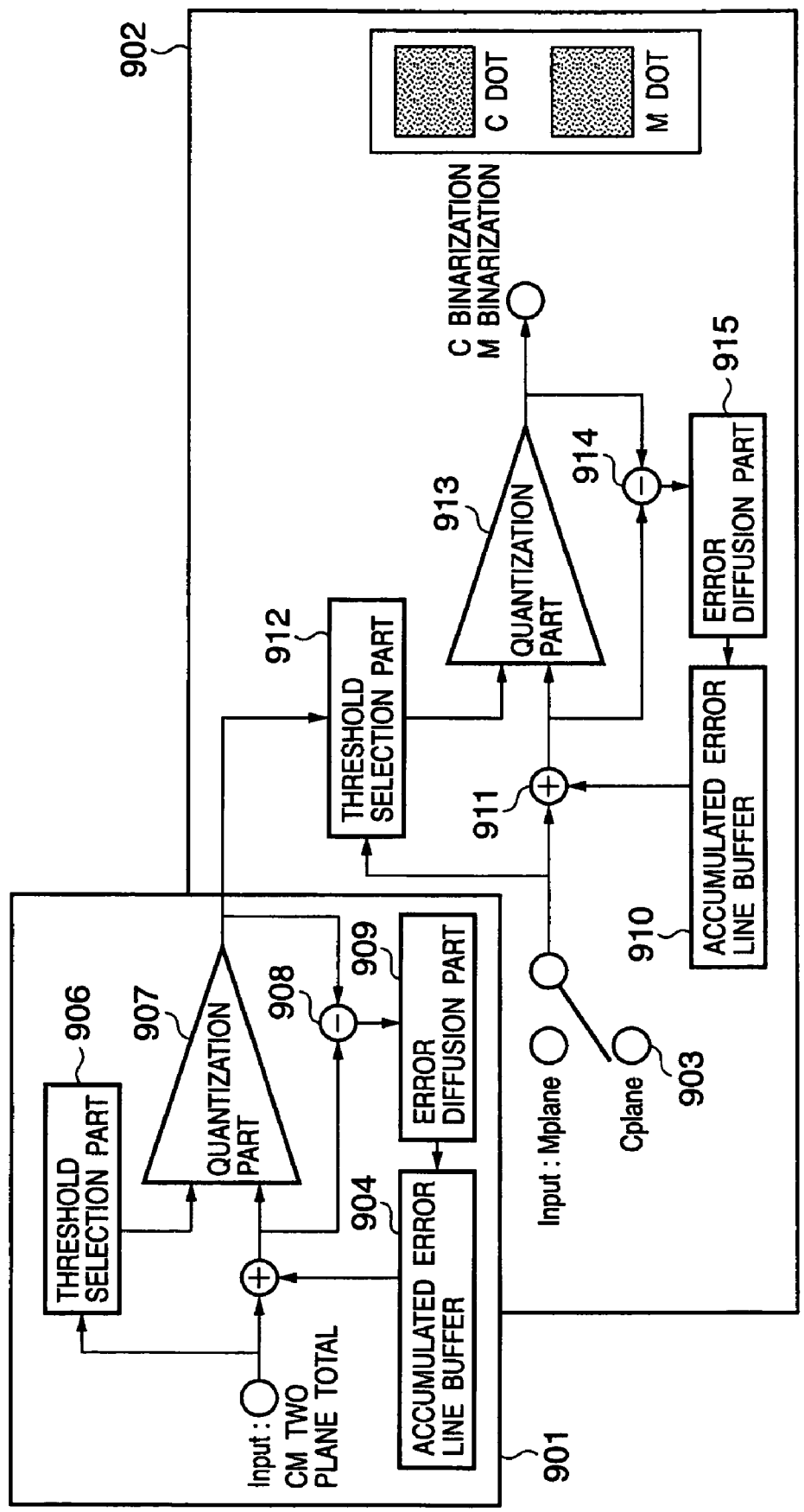
FIG. 12 is a block diagram showing the configuration of a halftone processing part according to a third embodiment of the invention.
Figure 15:
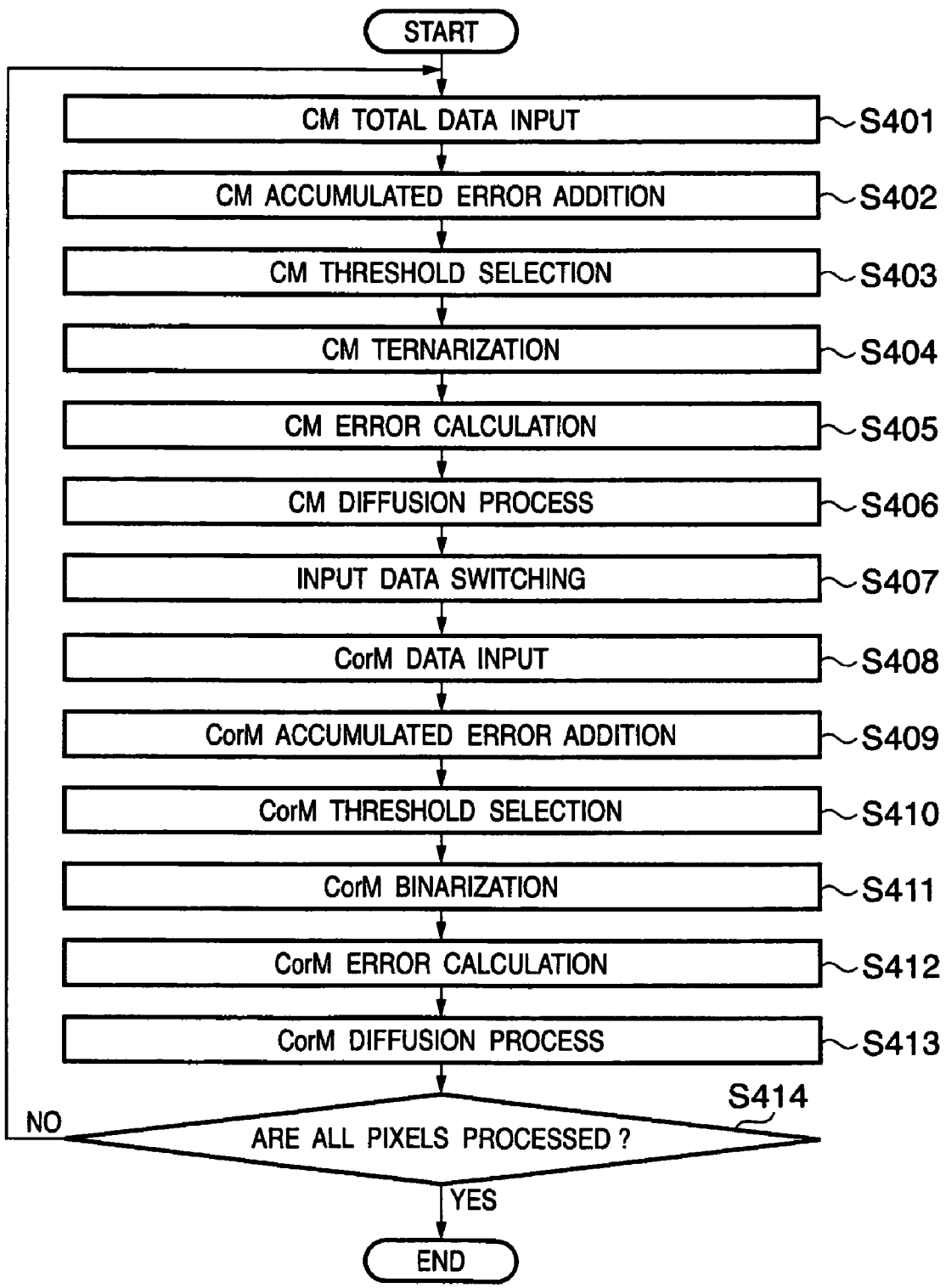
FIG. 15 is a flowchart showing a process of the halftone processing part according to the third embodiment.

For the sake of simplifying the explanation, the error diffusion for the pixel value C_l' on the large dot plane of cyan and the pixel value M_l' on the large dot plane of magenta is taken as an example. Referring to FIG. 12 and FIG. 15, the operation of the third embodiment will be described below. FIG. 12 is a block diagram for explaining the configuration of the halftone processing part 106 according to the third embodiment. Also, FIG. 15 is a flowchart for explaining the operation of the halftone processing part 106 according to the third embodiment.

When the data of two planes of cyan and magenta is binarized (quantized values of 0 and 255), first of all, at step S401, the total data I_cm of the noticed pixel on two planes of cyan and magenta is inputted into a ternarization part 901. Herein, I_cm is calculated in the following way.

$$I\_cm = C\_l' + M\_l' \tag{76}$$

Figure 10D:
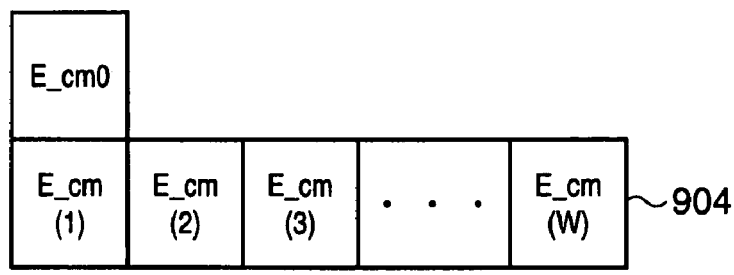

An accumulated error line buffer 904 in the CM ternarization part 901 of FIG. 12 has one storage area E_cm0, and the storage areas E_cm(x) (x=1 to W) the number of which is equal to the transverse pixel number W of the input image, as shown in FIG. 10D, and stores a quantization error by a method as will be described later. The accumulated error line buffer 904 may be entirely initialized to an initial value 0 before starting the processing, or initialized to the random value.

At step S402, an accumulated error addition part 905 adds an error E_cm(x) corresponding to the transverse pixel position x of the input pixel data. That is, assuming that the input data of the noticed pixel is I_cm and the data after adding the accumulated error is I_cm', $$I\_cm' = I\_cm + E\_cm(x) \tag{77}$$

results.

At step S403, a threshold selection part 906 selects a threshold T_cm. The threshold T_cm is set in accordance with a range of input pixel data I_cm as follows.

$$T\_cm(I\_cm) = 128 \ (0 \leq I\_cm \leq 255) \tag{78}$$

$$T\_cm(I\_cm) = 384 \ (255 < I\_cm \leq 510) \tag{79}$$

Or to avoid a dot generation delay, the threshold T_cm may be changed minutely in accordance with the input pixel data I_cm to reduce the average quantization error.

At step S404, a CM quantization part 907 compares the pixel data I_cm' after addition of error and the threshold T(I_cm) to decide the output pixel value Out_cm. The rules are as follows.

$$Out\_cm = 0 \tag{80}$$

$(0 \leq I\_cm \leq 255, I\_cm' < T(I\_cm))$ $$Out\_cm = 255 \tag{81}$$

$(0 \leq I\_cm \leq 255, I\_cm' \geq T(I\_cm))$ or
$(255 < I\_cm \leq 510, I\_cm' < T(I\_cm))$ $$Out\_cm = 510 \tag{82}$$

$(255 \leq I\_cm \leq 510, I\_cm' \geq T(I\_cm))$ or
$(510 < I\_cm \leq 765, I\_cm' < T(I\_cm))$ Herein, Out_cm=0 . . . It is settled that none of cyan and magenta dots is shot.

Out_cm=255 . . . Any one of cyan and magenta dots is shot.

Out_cm=510 . . . It is settled that both the cyan and magenta dots are shot.

At step S405, an error calculation part 908 calculates a difference Err_cm between the pixel data I_cm' after addition of error to the noticed pixel I_cm and the output pixel value Out_cm as follows.

$$Err\_cm(x) = I\_cm' - Out\_cm \tag{83}$$

And at step S406, a CM error diffusion part 909 performs the diffusion processing for the error Err_cm(x) in accordance with the transverse pixel position x in the following way.

$E\_cm(x+1) \leftarrow E\_cm(x+1) + Err\_cm(x) \times 7/16 \ (x < W)$ $E\_cm(x-1) \leftarrow E\_cm(x-1) + Err\_cm(x) \times 3/16 \ (x > 1)$ $E\_cm(x) \leftarrow E0\_cm + Err\_cm(x) \times 5/16 \ (1 < x < W)$ $E\_cm(x) \leftarrow E0\_cm + Err\_cm(x) \times 8/16 \ (x = 1)$ $E\_cm(x) \leftarrow E0\_cm + Err\_cm(x) \times 13/16 \ (x = W)$ $E0\_cm \leftarrow E\_cm \times 1/16 \ (x < W)$ $$E0\_cm \leftarrow 0 \ (x = W) \tag{84}$$

With the above, the ternarization of the total data of two planes of one pixel for cyan dot, C_l' and magenta dot, M_l' is completed. The ternarization of the total data of two planes aims at securing the optimal arrangement on at least two planes in total, although it is unknown which dot on two planes is shot.

At step S407, an input data switching part 903 switches the cyan and magenta input data for each pixel. For example, in the input data switching part 903, the substitution for I is switched randomly, as shown in the expressions (85) and (86).

When Rnd≦0.5

$$I = C\_l' \quad (85)$$

when Rnd>0.5

$$I = M\_l' \quad (86)$$

Where Rnd is the uniform random number in a range of 0≦Rnd≦1.

In the third embodiment, the input data switching part 903 switches the input randomly for each pixel using the random number, but any other methods may be employed. For example, input data with greater Duty (input data value) may be always substituted for I. Or input data with smaller Duty (input data value) may be always substituted for I.

Moreover, data may be switched to be equal to the Duty ratio (input data value ratio) between cyan and magenta and substituted.

$$\text{If } Rnd \leq C\_l'/(C\_l' + M\_l')$$

$$I = C\_l'$$

$$\text{If } C\_l'/(C\_l' + M\_l') < Rnd$$

$$I = M\_l'$$

Where Rnd is the uniform random number in a range of 0≦Rnd≦1.

Figure 10E:
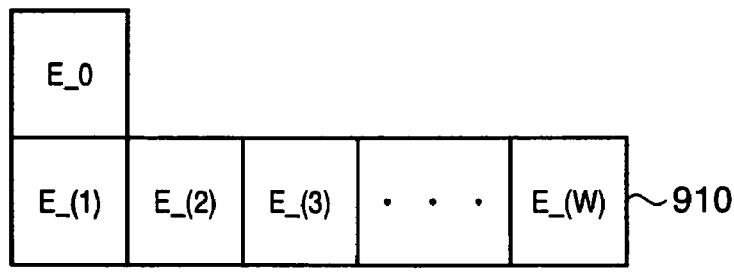

An accumulated error line buffer 910 in the binarization part 902 of FIG. 12 has one storage area E_0, and the storage areas E_(x) (x=1 to W) the number of which is equal to the transverse pixel number W of the input image, as shown in FIG. 10E, and stores a quantization error by a method as will be described later. The accumulated error line buffer 910 may be entirely initialized to an initial value 0 before starting the processing, or initialized to the random value.

At step S409, an accumulated error addition part 911 adds an error E(x) corresponding to the transverse pixel position x of the input pixel data. That is, assuming that the data after adding the accumulated error is I', the value of input data I of the noticed pixel is $$I' = I + E(x) \quad (87)$$

At step S410, a threshold selection part 912 selects a threshold T. For example, putting $$t = I\_cm - I \quad (88)$$

the threshold T is set as $$T(t) = 128 \ (0 \leq t \leq 255)$$

Or to avoid a dot generation delay, the threshold T may be changed minutely in accordance with t to reduce the average quantization error. Since I_cm−I is 255 or less, T(t) is necessarily equal to 128 in this embodiment.

At step S411, a CorM quantization part 912 compares the pixel data I' after addition of error, the threshold T(t) and the multivalued (quantized values of 0, 255 and 510) result Out_cm of the total data of CM two planes. And it decides the cyan dot final binarization result Out_c and the magenta dot final binarization result Out_m, based on this comparison result. The rules are as follows.

In the case where Rnd≦0.5

$$\text{when } Out\_cm - I' \geq T(t) \quad (89)$$

$$Out\_c = Out\_cm - 255 \quad (90)$$

$$Out\_m = 255 \quad (91)$$

$$\text{when } Out\_cm - I' < T(t) \quad (92)$$

$$Out\_c = Out\_cm \quad (93)$$

$$Out\_m = 0 \quad (94)$$

In the case where Rnd>0.5

$$\text{when } Out\_cm - I' \geq T(t) \quad (95)$$

$$Out\_m = Out\_cm - 255 \quad (96)$$

$$Out\_c = 255 \quad (97)$$

$$\text{when } Out\_cm - I' < T(t) \quad (98)$$

$$Out\_m = Out\_cm \quad (99)$$

$$Out\_c = 0 \quad (100)$$

In the case where Rnd≦0.5, if Out_cm is equal to 510, Out_cm−I'≧T(t), whereby the condition of expression (89) holds, and Out_c is equal to 255. Also, in the case where Rnd>0.5, if Out_cm is equal to 510, Out_c−I'≧T(t), whereby the condition of expression (95) holds, and Out_m is equal to 255. In this way, the binarized value of cyan plane data is decided in accordance with the expressions (89) to (100), and at the same time the binarized value of magenta plane is decided.

At step S412, an error calculation part 914 calculates a difference Err between the pixel data I' after addition of error to the noticed pixel I and the output pixel value Out in the following way.

$$Err(x) = I' - Out \quad (101)$$

And at step S413, an error diffusion part 915 diffuses the error Err(x) in accordance with the transverse pixel position x in the following way.

$$E(x+1) \leftarrow E(x+1) + Err(x) \times 7/16 \ (x < W)$$

$$E(x-1) \leftarrow E(x-1) + Err(x) \times 3/16 \ (x > 1)$$

$$E(x) \leftarrow E0 + Err(x) \times 5/16 \ (1 < x < W)$$

$$E(x) \leftarrow E0 + Err(x) \times 8/16 \ (x = 1)$$

$$E(x) \leftarrow E0 + Err(x) \times 13/16 \ (x = W)$$

$$E0 \leftarrow E \times 1/16 \ (x < W)$$

$$E0 \leftarrow 0 \ (x = W) \quad (102)$$

With the above, the binarization (quantized values of 0 and 255) of the cyan dot C_l' plane data of one pixel is completed. At the same time, the binarization (quantized values of 0 and 255) result of the magenta dot M_l' is settled.

Herein, the binarization of cyan and magenta planes is switched as shown in the expressions (85) and (86), whereby only any one of cyan and magenta is not optimally arranged. Therefore, when visually conspicuous dots of both are arranged, it is possible to avoid a trouble that one is optimally arranged but the other is not optimally arranged as in the first embodiment. Since the error diffusion for the CM total data is firstly made, the optimal arrangement is secured as seen from CM totally.

Other Embodiments

Each of the above embodiments has been described in connection with the image processing apparatus employing an ink jet recording method of forming the image by discharging the ink onto the recording medium, while scanning a recording head having a plurality of nozzles arranged in the predetermined direction over the recording medium in the direction crossing the direction where the nozzles are arranged. However, this invention may be applied to the recording apparatus that performs the recording in accordance with any other method than the ink jet method. In this case, the nozzles for discharging ink droplets correspond to the recording elements for recording the dots.

For example, this invention may be applied to a so-called full-line type recording apparatus that performs the recording by moving the recording medium with the recording head having the length corresponding to the recording width of the recording medium.

Also, the processes as described in the first to third embodiments may be appropriately combined and performed. The processes of the first to third embodiments will be more generally described in the following.

First of all, the total value of corresponding pixels for n planes to be processed is subjected to the error diffusion process and quantized into n+1 levels to obtain the quantized value regarding n planes (corresponding to steps S201 to S206 and S301 to S306). And n planes are divided into the n−k planes with high priority and the k planes with low priority, and the total value of corresponding pixels on the n−k planes is subtracted from the quantized value regarding the n planes. The quantized value regarding the k planes is decided, based on this difference. At this time, the quantized value regarding the n−k planes is decided by subtracting the quantized value regarding the k planes from the quantized value regarding the n planes. A quantization error occurring at this time is dispersed over other pixels to be reflected to the "total value of corresponding pixels on the n−k planes", and accumulated (corresponding to the steps S207 to S212, S213 to S218 and S307 to S312).

Herein, if k is equal to 1, the final quantized value of one plane is decided through the above process. And the above process is repeated by setting n to n−1, and if the above process for the n−k planes and the k planes at n=2 is ended, the quantized values for all the planes are decided. This is the process of the first embodiment (corresponding to the steps S207 to S212 and S213 to S218). Also, if k≧2, the quantized value for each plane can be decided by applying the random selection as described in the second embodiment to the k planes (corresponding to the steps S307 to S313). And the above process is repeated by setting n to n−k. If k≧2, the k planes are arranged one by one in the priority order (the process of the first embodiment is performed). Or if k=2, the quantized values of the two planes may be decided employing the process of the third embodiment.

Also, when the process for two planes is performed at the stage where n=2, the process according to the third embodiment may be applied (corresponding to the steps S401 to S413).

As described above, with each of the above embodiments, the binarization can be made by performing the error diffusion process n or less times until the final dot position for the n plane data in which the amount of recording material is specified for each of the density, color and dot diameter is decided. For example, the high image quality processing is allowed if the number of performing the error diffusion process is n, and the fast processing is allowed if the number of performing the error diffusion process is below n. Particularly with the first embodiment, the error diffusion is performed n times, but it is unnecessary to obtain the correction data as described in patent document 1, whereby the processing is simplified and the fast processing is expected. Also, with the second embodiment, the number of executing the error diffusion can be set to n or less, whereby the processing amount (processing speed) and the image quality can be changed flexibly.

Moreover, with the third embodiment, in the case where the priority order is equivalent as in the "dot arrangement of the color material with different color but the same density", the optimal dot position for both can be decided. Accordingly, when two channel data of cyan and magenta with the same density is binarized, for example, it is possible to avoid a trouble that the optimal arrangement is obtained for only one.

With the invention, the dot arrangement according to the priority of dot can be made in accordance with the simpler procedure.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-187084, filed on Jun. 27, 2005, which is hereby incorporated by reference herein in its entirety.

What is claimed is:

1. An image processing method for deciding quantization data on each image plane of image data composed of at least first and second image planes, comprising:

an obtaining step of obtaining a sum total value of a first pixel value of the first image plane and a second pixel value of the second image plane, the first and second pixel values existing at the same position on the first and second image planes;

a quantization step of performing a quantization process according to an error diffusion method for the sum total value, using a first threshold, and deciding a first quantized value;

a selection step of selecting one of the first pixel value of the first image plane and the second pixel value of the second image plane to output a selected value; and a generation step of generating a second quantized value of the first image plane and a third quantized value of the second image plane, the second quantized value and the third quantized value being based on a comparison result between a second threshold and a differential value, the differential value being a difference between the first quantized value and an additional value, the additional value being generated by adding of the selected value and an error that has been derived from peripheral pixels, and generating a diffusing error derived from the generation of the second quantized value and the third quantized value to peripheral pixel positions, wherein the number of levels of the first quantized value is larger than that of the second and third quantized values.

2. The image processing method according to claim 1, wherein said generation step comprises:

generating the second and third quantization values, when the first pixel value is selected as the selected value in said selection step, by comparing the second threshold with a differential value between the first quantization value and an additional value of the first pixel value and the error, and diffusing error between the second quantization value and the first pixel value after an addition of error to transverse pixel positions; and generating the second and third quantization values, when the second pixel value is selected as the selected value in said selection step, by comparing the second threshold with a differential value between the first quantization value and an additional value of the second pixel value and the error, and diffusing error between the third quantization value and the second pixel value after an addition of error to transverse pixel positions.

3. An image processing apparatus for deciding quantization data on each image plane of image data composed of at least first and second image planes, comprising:

an obtaining unit configured to obtain a sum total value of a first pixel value of the first image plane and a second pixel value of the second image plane, the first and second pixel values existing at the same position on the first and second image planes;

a quantization unit configured to perform a quantization process according to an error diffusion unit for the sum total value using a first threshold, and deciding a first quantized value;

a selection unit configured to select one of the first pixel value of the first image plane and the second pixel value of the second image plane to output a selected value; and a generation unit of generating a second quantized value of the first image plane and a third quantized value of the second image plane, the second quantized value and the third quantized value being based on a comparison result between a second threshold and a differential value, the differential value being a difference between the first quantized value and an additional value, the additional value being generated by adding of the selected value and an error that has been derived from peripheral pixels, and generating diffusing error derived from the generation of the second quantized value and the third quantized value to peripheral pixel positions, wherein the number of levels of the first quantized value is larger than that of the second and third quantized values.

4. The image processing apparatus according to claim 3, wherein said generation unit:

generates the second and third quantization values by comparing the second threshold with a differential value between the first quantization value and the first pixel value and the error when the first pixel value is selected by said selection unit, and diffuses error between the second quantization value and the first pixel value after an addition of error to transverse pixel positions; and generates the second and third quantization values by comparing the second threshold with a differential value between the first quantization value and the second pixel value after an addition of the error when the second pixel value is selected by said selection unit, and diffuses error between the third quantization value and the second pixel value after an addition of error to transverse pixel positions.

5. The image processing method according to claim 1, wherein said selection step randomly selects for each pixel the first pixel value in the first image plane or the second pixel value in the second image plane.

6. The image processing method according to claim 1, wherein said selection step selects a pixel value with greater density from the first and second values.

* * * * *